United States Patent [19]
Osakabe et al.

[11] Patent Number: 5,933,430
[45] Date of Patent: *Aug. 3, 1999

[54] DATA COMMUNICATION METHOD

[75] Inventors: Yoshio Osakabe; Hisato Shima, both of Kanagawa; Makoto Sato, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/694,592

[22] Filed: Aug. 9, 1996

[30] Foreign Application Priority Data

Aug. 12, 1995 [JP] Japan .................................. 7-227407

[51] Int. Cl.$^6$ ....................................................... H04L 5/22
[52] U.S. Cl. .......................................... 370/395; 370/463
[58] Field of Search ................................. 370/395, 463, 370/476

[56] References Cited

U.S. PATENT DOCUMENTS

| | | | |
|---|---|---|---|
| 5,535,208 | 7/1996 | Kawakami et al. .................... | 370/400 |
| 5,640,392 | 6/1997 | Hayashi .................................. | 370/395 |
| 5,680,266 | 10/1997 | Park ........................................ | 360/48 |
| 5,710,773 | 1/1998 | Shiga ...................................... | 370/512 |

*Primary Examiner*—Melvin Marcelo
*Attorney, Agent, or Firm*—Frommer Lawrence & Haug, LLP; William S. Frommer

[57] ABSTRACT

It is an object of the present invention to reduce the number of terminals in an equipment for inputting or outputting a realtime digital signal such as a digital audio signal and a music/musical instrument signal. A first converter and a second converter are provided with a function of mutual conversion between a signal format of a digital audio interface and a signal format of IEEE-1394. For example, it is possible to transmit a signal of a digital audio interface outputted from a first CD player to the first converter, to convert the signal here into a packet of IEEE-1394 isochronous transmission format and transmit it to the second converter, and to return the packet to the digital audio interface and record a digital audio signal in an MD recorder. When a converter having a function of mutual conversion between the MIDI signal format and the IEEE-1394 signal format is provided, it is also possible to perform bidirectional data communication among a plurality of MIDI musical instruments.

16 Claims, 29 Drawing Sheets

→ DIGITAL AUDIO INTERFACE
←--→ CONTROL BUS
←→ IEEE-1394 SERIAL BUS

FIG. 5

| 0 | 0 | SID | DBS | FN | QPC | SPH | Rsv | DBC |
| 1 | 0 | FMT | FDF | | | | | |

FIG. 6

| FMT | CONTENTS |
|---|---|
| 0 0 0 0 0 0$_2$ | DVCR |
| 0 0 0 0 0 1$_2$ | MPEG |
| 0 0 0 0 1 0$_2$ | LINEAR AUDIO |
| 0 0 0 0 1 1$_2$ | NON-LINEAR AUDIO |
| 0 0 0 1 0 0$_2$ | MUSIC/MUSICAL INSTRUMENT |
| 0 0 0 1 0 1$_2$ | (RESERVED) |
| ⋮ | ⋮ |
| 1 1 1 1 0 1$_2$ | (RESERVED) |
| 1 1 1 1 1 0$_2$ | FREE |
| 1 1 1 1 1 1$_2$ | NO DATA |

FIG. 9

| DATAF | CONTENTS | | |
|---|---|---|---|
| 00000000₂ | DIGITAL AUDIO INTERFACE | Fs = 44.1 kHz | ASYNCHRONOUS MODE |
| 00000001₂ | DIGITAL AUDIO INTERFACE | Fs = 48 kHz | ASYNCHRONOUS MODE |
| 00000010₂ | (RESERVED) | | |
| 00000011₂ | DIGITAL AUDIO INTERFACE | Fs = 32 kHz | ASYNCHRONOUS MODE |
| 00010000₂ | RAW AUDIO | | ASYNCHRONOUS MODE |
| 10000000₂ | DIGITAL AUDIO INTERFACE | Fs = 44.1 kHz | SYNCHRONOUS MODE |
| 10010000₂ | RAW AUDIO | | SYNCHRONOUS MODE |

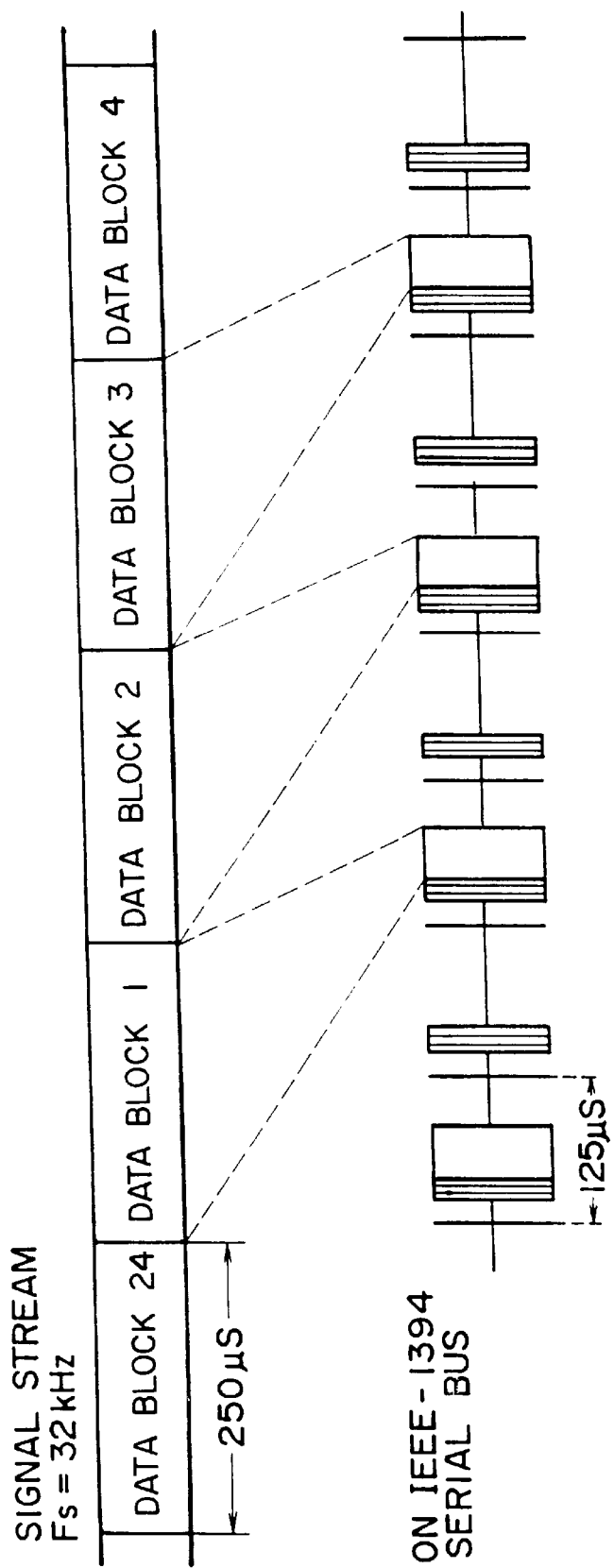

FIG. 13

| | | DATA LENGTH | tag | CHANNEL | tCode | sv |
|---|---|---|---|---|---|---|
| CIP | 0 0 | SID | | DBS | FN QPC | Rsv |
| HEADER | 1 0 | FMT | | DATAF | SYT | |
| | | | HEADER CRC | | | |
| FR1 | B/M | * * | LSB AUX | LSB | AUDIO DATA | MSB V U C P |
| | W | * * | LSB AUX | LSB | AUDIO DATA | MSB V U C P |
| FR2 | M | * * | LSB AUX | LSB | AUDIO DATA | MSB V U C P |
| | W | * * | LSB AUX | LSB | AUDIO DATA | MSB V U C P |
| FR7 | M | * * | LSB AUX | LSB | AUDIO DATA | MSB V U C P |
| | W | * * | LSB AUX | LSB | AUDIO DATA | MSB V U C P |
| FR8 | M | * * | LSB AUX | LSB | AUDIO DATA | MSB V U C P |
| | W | * * | LSB AUX | LSB | AUDIO DATA | MSB V U C P |
| | | | DATA CRC | | | |

1 QUADLET = 32 BITS

| DATAF | CONTENTS |
|---|---|
| 00000000₂ | MIDI |
| 00000001₂ | MIDI STATE |
| 000000010₂ | MIDI CONTROL |
| 000000011₂ | OTHER FORMAT |

F I G. 33
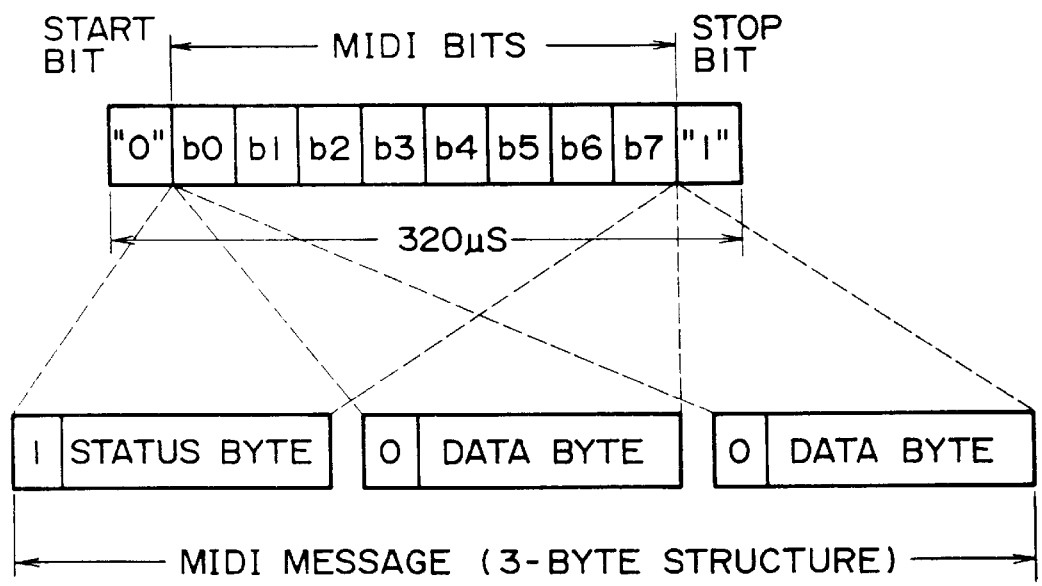

FIG. 34

| | | | | 1ST BYTE | 2ND BYTE | 3RD BYTE |
|---|---|---|---|---|---|---|
| MIDI MESSAGE | CHANNEL MESSAGE | VOICE MESSAGE | NOTE ON | 9nH | NOTE NO. | VELOCITY |
| | | | NOTE OFF | 8nH | NOTE NO. | VELOCITY |
| | | | POLYPHONIC KEY PRESSURE | AnH | NOTE NO. | PRESSURE VALUE |
| | | | CONTROL CHANGE | BnH | CONTROL NO. | CONTROL VALUE |
| | | | PROGRAM CHANGE | CnH | PROGRAM NO. | |
| | | | CHANNEL PRESSURE | DnH | PRESSURE VALUE | |
| | | | PITCH BEND | EnH | LSB | MSB |
| | | MODE MESSAGE | ALL SOUND OFF | BnH | 78 | 00 |
| | | | RESET ALL CONTROLLERS | BnH | 79 | 00 |
| | | | LOCAL CONTROL | BnH | 7A | dd |
| | | | ALL NOTES OFF | BnH | 7B | 00 |
| | | | OMNI OFF | BnH | 7C | 00 |
| | | | OMNI ON | BnH | 7D | 00 |
| | | | MONO ON (POLY OFF) | BnH | 7E | 00 |
| | | | POLY ON (MONO OFF) | BnH | 7F | 00 |
| | SYSTEM MESSAGE | EXCLUSIVE MESSAGE | | F0H | ID | ……………F7H |
| | | COMMON MESSAGE | QUARTER FRAME MESSAGE | F1H | dd | |
| | | | SONG POSITION POINTER | F2H | LSB | MSB |
| | | | SONG SELECT | F3H | dd | |
| | | | TUNE REQUEST | F6H | | |
| | | | END OF EXCLUSIVE | F7H | | |
| | | REALTIME MESSAGE | TIMING CLOCK | F8H | | |
| | | | START | FAH | | |
| | | | CONTINUE | FBH | | |
| | | | STOP | FCH | | |
| | | | ACTIVE SENSING | FEH | | |
| | | | SYSTEM RESET | FFH | | |

| 3 | 2 | 1 | 0 | |
|---|---|---|---|---|
| 0 | 0 | 0 | 0 | 1ch |
| 0 | 0 | 0 | 1 | 2ch |
| 0 | 0 | 1 | 0 | 3ch |
| 0 | 0 | 1 | 1 | 4ch |
| 0 | 1 | 0 | 0 | 5ch |
| 0 | 1 | 0 | 1 | 6ch |
| 0 | 1 | 1 | 0 | 7ch |
| 0 | 1 | 1 | 1 | 8ch |
| 1 | 0 | 0 | 0 | 9ch |
| 1 | 0 | 0 | 1 | 10ch |
| 1 | 0 | 1 | 0 | 11ch |
| 1 | 0 | 1 | 1 | 12ch |
| 1 | 1 | 0 | 0 | 13ch |
| 1 | 1 | 0 | 1 | 14ch |
| 1 | 1 | 1 | 0 | 15ch |
| 1 | 1 | 1 | 1 | 16ch |

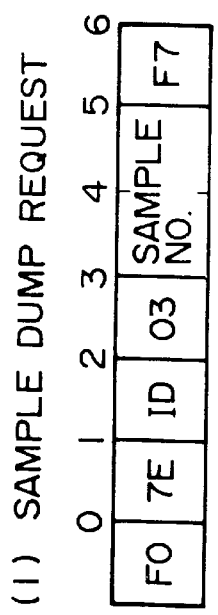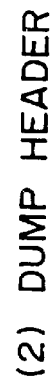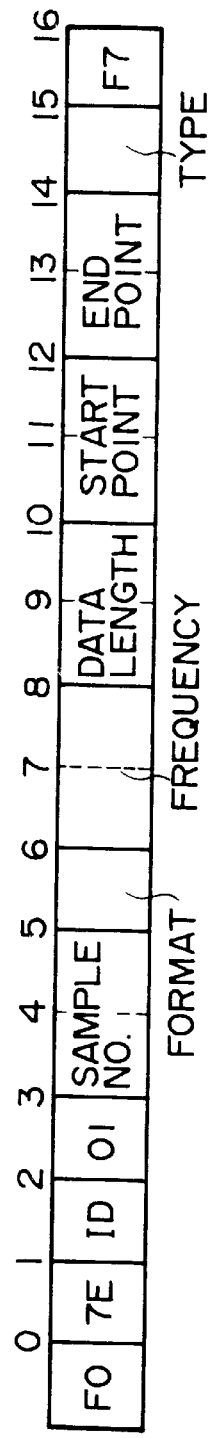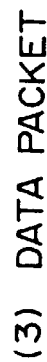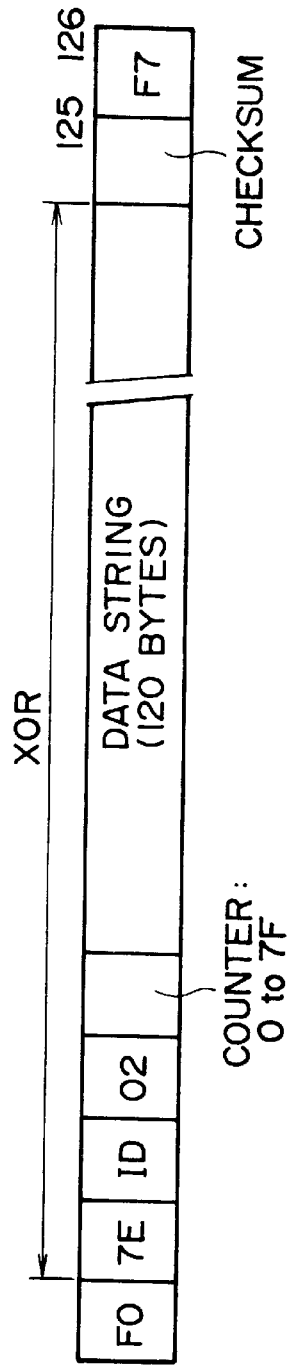
FIG. 37

DATA COMMUNICATION METHOD

BACKGROUND OF THE INVENTION

1. Field of the Invention

The present invention relates to a technique of transmitting a realtime digital signal such as a digital audio signal and a music/musical instrument signal, and more particularly to a technique of curtailing the number of terminals in an apparatus for inputting or outputting a digital signal and transmitting the digital audio signal and the music/musical instrument signal in a common format.

2. Description of Related Art

It is being performed generally in recent years that digital audio equipments and electronic musical instruments are connected with one another by digital signal lines, thereby to perform transmission of a digital signal.

A digital audio interface prescribed in a document of IEC 958 for instance (hereinafter referred to simply as a digital audio interface) is used in a digital audio equipment for public welfare or business.

A transmission example of a digital audio signal using a digital audio interface is shown in FIG. 25. In FIG. 25, an output interface 81 is built in a compact disk (CD) player for instance, and an input interface 89 is built in a minidisc (MD) recorder for instance. Further, a digital audio signal written in a register 82 of the output interface 81 is read therefrom and added with an error correction code in a parity bit addition circuit 83, then the signal is subjected to biphase mark modulation and addition processing of a synchronous pattern in a biphase modulation/synchronous pattern addition circuit 84 and is formed into a digital audio signal conforming to the digital audio interface, and is outputted from an output terminal of the CD player for instance. Then, the signal is inputted to the input interface 89 from an input terminal of the MD recorder for instance through a coaxial cable 85 or an optical fiber cable 87. Here, in transmission through the optical fiber cable 87, the digital audio signal conforming to the digital audio interface is converted into an optical signal by means of a transmission module 86 provided in the CD player for instance, and the optical signal is converted into a digital audio signal conforming to the digital audio interface by means of a reception module 88 provided in the MD recorder for instance.

In the input interface 89, the digital audio signal is subjected to detection of a synchronous pattern and biphase mark demodulation processing by a synchronous pattern detection/biphase demodulation circuit 90, subjected to error correction processing in a parity bit check circuit 91, returned to the original digital audio signal through a register 92, and sent to a digital sound recording circuit (not shown) of the MD recorder for instance.

Besides, when digital sound recording is made from an MD recorder to another MD recorder or to a digital audio tape (DAT) recorder, and when the MD recorder is connected to a digital preamplifier provided with a DA converter so as to transmit a digital signal directly, it is required to provide the output interface of the digital audio interface in the MD recorder.

FIG. 26 shows a structure of a subframe of the digital audio interface. Further, FIG. 27 shows the structure of subframes, frames and blocks of the digital audio interface.

As shown in FIG. 26, in a protocol of the digital audio interface, the subframe transmits a channel 1 (left channel) or a channel 2 (right channel) of a stereo signal and channels 1, 2, 3 and 4 of a four channel stereo signal. Further, the subframe is composed of 32 bit portions in total, as follows.

① Sync. preamble ... 4 bit portions from b0 to b3
② AUX (auxiliary bit) ... 4 bit portions from b4 to b7
③ Audio data ... 20 bit portions from b8 to b27
④ Validity flag ... 1 bit portion of b28
⑤ User data ... 1 bit portion of b29
⑥ Channel status ... 1 bit portion of b30
⑦ Parity bit ... 1 bit portion of b31

As shown in FIG. 27, the frame attains a length of 64 bit portions which is twice as long as the subframe. In the CD, the sampling frequency is 44.1 kHz, and a 2-channel stereo signal having 16 bits are recorded. When a CD signal is transmitted by the digital audio interface, the MSB of the CD data in 16 bits is placed in b27 of the subframe of the digital audio interface, and up to the LSB are placed thereafter in b12. Further, $0_2$ is placed in 4 bits of b11 to b8 of the subframe and b7 to b4 of the AUX. Thus, a transmission velocity in the digital audio interface of the CD signal becomes 44.1 kHz×64 bits=2.8224 Mbps. Further, in the digital audio interface, the sampling frequency corresponds to 48 kHz and 32 kHz other than 44.1 kHz.

In channel coding of the digital audio interface, biphase mark modulation in which logic "0" is expressed with two bits $00_2$ or $11_2$ having a period of T/2 when it is assumed that the bit period is T and logic "1" is expressed with $01_2$ or $10_2$ of T/2 is performed. The maximum inversion spacing of biphase mark modulation is the bit period T, and the minimum inversion spacing thereof is T/2.

A unique symbol including 3T/2 which is against the rule of biphase mark modulation is used for synchronization and preamble. This symbol includes three types, i.e., the start of the block and the start of channel 1 B, the start M of the channel 1, and the start W of the channels 2, 3 or 4, and B: $11101000_2$ or $00010111_2$
M: $11100010_2$ or $00011101_2$
W: $11100100_2$ or $00011011_2$ are used.

As shown in FIG. 27, one block is composed of 192 pieces of frames, and the preamble of B is placed at the start of the block. Further, it is possible to form a channel status in a table of 192 bits of one block portion, thereby to transmit various data. Besides, no data corresponding to a control signal of the equipment and an address of the equipment are prescribed in this table.

Since no address information is added to the digital audio interface, point-to-point communication, i.e., data transmission only among apparatuses connected with cables is performed. Accordingly, in an apparatus that becomes the center of signal connection such as a television set (TV) of video apparatus and an amplifier and a receiver of an audio system, signal lines of digital audio interface are connected concentratedly in a tree shape from a plurality of digital audio equipments.

FIG. 28 shows an example of a system in which a plurality of audio equipments and video equipments are connected concentratedly to a digital amplifier. In this example, a digital sound program tuner 101, a speaker 103, CD players 104 and 105, an MD recorder 106, a DAT recorder 107 and a digital video cassette recorder (hereinafter referred to as a DVCR) 108 are connected concentratedly to a digital amplifier 102 provided with a DA converter.

Further, respective apparatuses are connected to one another unidirectionally or bidirectionally by means of signal lines (coaxial cables and optical fibers) of the digital audio interface described previously. Since the digital audio interface is capable of unidirectional transmission only, two signal lines are provided among apparatuses connected bidirectionally (among respective apparatuses of the MD recorder 106, the DAT recorder 107, the DVCR 108 and the digital amplifier 102).

In the system shown in FIG. 28, in order to make sound recording or the like in the MD recorder 106 from the CD player 104 or 105 for instance without assistance or automatically, it is necessary to transmit control signals for the above among these apparatuses. However, since no method of transmitting such control signals is prescribed in the digital audio interface as described previously, it is necessary to jointly use another interface for control. Therefore, the digital amplifier 102 is connected to respective apparatuses by control buses. There are various standards in such an interface for control.

Further, in recent years, performance information, control information, synchronizing information or the like are transmitted among electronic musical instruments connected with one another by the interface prescribed by Musical Instrument Digital Interface (MIDI) standards (hereinafter referred to simply as MIDI musical instruments).

The MIDI standards include three types of terminals such as a MIDI IN terminal (hereinafter referred to as IN), a MIDI OUT terminal (hereinafter referred to as OUT) and a MIDI THRU terminal (hereinafter referred to as THRU), and MIDI musical instruments are equipped normally with IN and OUT and THRU is also provided in many musical instruments. THRU is a terminal having a function of outputting the MIDI signal inputted from IN as it is.

When OUT of a MIDI musical instrument (master) 110 is connected to IN of a MIDI musical instrument (slave) 111 with a MIDI dedicated cable (hereinafter referred to as a MIDI cable) and a keyboard of the MIDI musical instrument 110 is played, the MIDI musical instrument 111 is performed together. That which becomes the master is an equipment generating data of MIDI such as an electronic musical instrument and a sequencer having a keyboard and is called a MIDI controller. As the slave, a sound source module of only a sound source having no keyboard, an effecter and all of other MIDI musical instruments can be connected.

It is possible to connect OUT of a MIDI musical instrument 112 to IN of another MIDI musical instrument 113 and further connect THRU to IN of another MIDI musical instrument 114 in a cascade manner, and furthermore, to connect THRU to IN of another MIDI musical instrument 115 in a cascade manner as shown in FIG. 30, thereby to play a plurality of MIDI musical instruments at the same time. Since the MIDI signal is deteriorated every time it passes through the THRU, however, three sets to four sets are normally the limit in cascade connection by means of THRU such as shown in FIG. 30.

Therefore, in order to connect a plurality of MIDI musical instruments to one another, a method that the OUT of a MIDI musical instrument 116 is inputted to a parabox (referred to also as a THRU box) 117 and the outputs of the THRU box are connected to IN of a plurality of MIDI musical instruments 118 to 121 as shown in FIG. 31 is used. When a large number of MIDI musical instruments are connected, however, there is such a problem that MIDI cables are concentrated upon the THRU box and so on.

In normal MIDI communication, transmission in an open loop is performed having no concern on the transmitting (master) side in whether the receiving (slave) side is receiving correctly or not. However, when the data quantity is large among MIDI signals as the transmission of sampling data described later, the data are split so as to perform packet transmission. At this time, there is provided a function that an error check for confirming whether the data have been sent correctly or not is made, and retransmission is demanded in case the data have not been sent correctly. This is called transfer by handshake. When handshake is made, it is required to connect IN of a MIDI master 122 to OUT of a MIDI slave 123 with the MIDI cable as shown in FIG. 32.

The MIDI musical instrument is provided with terminals IN and OUT, but unidirectional communication in which standpoints of the master and the slave are fixed is performed and no correspondence to bidirectional communication is made. Therefore, there is such a problem that, even when the keyboard of the MIDI musical instrument which has been set to the slave once is played, the MIDI musical instrument of the master cannot be sounded. Further, in a cascade-connected system shown in FIG. 30, and in a system using the THRU box shown in FIG. 31, the equipment which is used as the master is determined in advance, and it is required to determine the order of connection of the MIDI musical instruments for performance. As a result, resetting when the musical instrument is moved is inconvenient, thus causing such a problem that the structure of a musical instrument that is set once is difficult to be altered and so on.

A message transmitted among MIDI musical instruments is called a MIDI message. The MIDI message is expressed by a byte train in one byte or more. As shown in FIG. 33, the byte train of the MIDI message is divided into a status byte and data bytes. The status byte expresses the type of the MIDI message, and the MSB bit 7 is "1". The status byte is normally accompanied by data bytes in a definite number. However, some messages are not accompanied by data byte. The MSB bit 7 of the data byte is "0".

As shown in FIG. 34, the MIDI message is classified into two, a channel message and a system message. The channel message is performance information for controlling individual musical instrument, and the system message is control information, synchronizing information or the like for controlling the whole MIDI system. Since a control command related to connection among musical instruments and so on is not allocated to the MIDI message, setting of the system, alteration of the structure or the like cannot be carried out through MIDI standards.

The system message is classified into a system exclusive message, a system common message and a system realtime message. The channel message includes a channel voice message (hereinafter referred to as a voice message) and a channel mode message (hereinafter referred to as a mode message).

In the MIDI message, the number of data bytes becomes two bytes or less excluding the system exclusive message, i.e., three bytes or less including the status byte. In FIG. 34, a small letter n expressing the status byte with a hexadecimal number is used for designating the MIDI channel.

A method of designating the MIDI channel is shown in FIG. 35. When a plurality of MIDI musical instruments are connected to a MIDI controller by MIDI cables in FIG. 30 or FIG. 31, it is possible to perform individual MIDI musical instrument independently by designating the MIDI channel. The MIDI channel has four bits and is able to designate 16 channels at the maximum.

FIG. 36 shows an example of a method of using the MIDI channel. To a MIDI controller 124 are connected three sets of MIDI musical instruments 125, 126 and 127. The MIDI musical instrument 125 sets tones of a saxophone, the MIDI musical instrument 126 sets tones of a piano, and the MIDI musical instrument 127 sets tones of an electric base. Further, when performance data for respective parts are sent from the MIDI controller 124, respective musical instruments generate sound with respect to each part.

As described, it is possible in the MIDI standards to designate a specific MIDI musical instrument among a plurality of MIDI musical instruments on the receiving side (slave) and transmit a message by the MIDI channel. However, since four bits in lower positions of the status byte are used for designation of the MIDI channel, it is difficult to increase the MIDI channel to a number of 16 or more.

As shown in FIG. 33, the operation is performed with asynchronous serial transfer at a transfer speed of 31.25 kbps (±1%) of the MIDI standards. The transfer is made in the order of start bit, bit 0, . . . , bit 7 and stop bit (10 bits in total), and the start bit is a logic "0" and the stop bit is a logic "1". 10×(1/31.25 kHz)=320 µs is required for transferring one byte. Since three bytes are required for a message of note-on that produces one sound in the MIDI system, it takes 320 µs×3 =approximately 1 ms for producing one sound by MIDI.

A MIDI musical instrument provided with a sampling function is called a sampler. Sampling means that a user produces live tones of musical instruments in the form of digital data and records these data in a memory or the like. Further, at time of reproduction, the digital data are taken out of the memory at free timing so as to produce a sound. Sample dump which is one of the universal system exclusive messages is used for the transmission of the sampling data taken out of the sampler. With the universal system exclusive message, it is possible to transmit/receive data among MIDI musical instruments manufactured by different manufacturers. The sample dump is a common format for transmitting the sampling data of the sampler.

FIG. 37 shows data formats of three MIDI messages, sample dump request, dump header and data packet. When dump request in (1) is outputted with a MIDI musical instrument, dump header in (2) is transmitted and then data packet in (3) is transmitted. The data packet has a fixed length of 127 bytes, and the data length is 120 bytes at the maximum.

Normally, the sampled waveform data include several ten Kbytes, and it is required to transmit a large number of data packets. When such a large quantity of data are transmitted at a time, a lot of time is required for processing of transmission and reception of MIDI, thus making it impossible to transmit performance information such as a channel message at the same time. Therefore, a switch for turning off so as to receive no system exclusive message is normally provided in the MIDI input/output function.

As described above, there have been problems set forth in (1) and (2) below in conventional digital audio interface standards.

(1) Two transmission lines become necessary in order to conduct bidirectional transmission, and two terminals of input and output are required on the apparatus side.

(2) The transmission lines are increased in an apparatus that becomes a center of the system, and a plurality of terminals of input and output are concentrated. When another interface is required for control, the number of terminals for inputting to and outputting from the apparatus is increased.

Further, there have been problems set forth in (3) to (7) below in transmission of a message according to conventional MIDI standards.

(3) Notwithstanding that IN and OUT terminals are provided in the MIDI musical instruments, unidirectional communication only is prescribed, thus being unadaptable to bidirectional communication.

(4) The MIDI musical instrument which becomes the master of the system is fixed, thus making it impossible to construct a flexible MIDI system.

(5) When a plurality of musical instruments are connected, cables are concentrated to the THRU box.

(6) The transmission speed being slow, it is difficult to transmit a large among of data.

(7) Connection information of the system and control commands for connection are not prepared.

Furthermore, it is expected to execute multiplex synthesis of performance information of the electronic musical instrument on a digital audio signal reproduced by a digital audio equipment using the digital audio interface described previously such as a CD player, or to execute multiplex synthesis of performance information of the electronic musical instrument on a voice (vocal) recorded/reproduced by an MD recorder and record it digitally, but it has been difficult to connect the electronic musical instrument and the digital audio equipment digitally because data formats and data transmission speeds of the MIDI standards and the digital audio interface are different from each other.

SUMMARY OF THE INVENTION

The present invention has been made in view of such actual circumstances, and has for its object to provide a data communication method in which the number of input/output terminals is decreased, and in particular, the numbers of cables and terminals required for signals and control of an apparatus that becomes a center of the system are also decreased as compared with a conventional system using a unidirectional interface.

Further, it is an object of the present invention to provide a data communication method which is able to improve a function of an electronic musical instrument.

In order to solve the above-mentioned subjects, a data communication method according to the present invention is characterized in that a format of an interface for transmitting digital data unidirectionally is converted into an isochronous transmission format or an asynchronous transmission format of an interface for transmitting digital data bidirectionally.

In the present invention, the digital signal is, for example, a digital audio signal or a music/musical instrument signal.

In the present invention, when the format of the interface for transmitting a music/musical instrument signal unidirectionally is converted into an asynchronous transmission format in bidirectional transmission of digital data, it is possible both to transmit with a format dedicated for the music/musical instrument signal and to transmit with a transmission format for the audio/video equipments.

Further, a control signal transmitted by an interface for transmitting digital data unidirectionally or by another interface connected to an apparatus provided with that interface may be converted into an asynchronous transmission format of an interface for transmitting digital data bidirectionally and transmitted together with digital data of an isochronous transmission format.

Furthermore, it is preferable that a header which belongs to a packet of an isochronous transmission format is made common to a plural types of digital data (such as linear digital audio, non-linear digital audio and music/musical instrument signals). Further, an identification code for identifying a mode of transmitting synchronously with an isochronous transmission cycle and a mode of transmitting asynchronously therewith on a plural types of digital data may be provided in the header. Furthermore, it is also possible to add an identification code for identifying the types of digital data to the data of the isochronous transmission format.

Further, it is possible to bit-compress a synchronous signal of an interface for transmitting digital data unidirectionally and to take the synchronous signal into the header of isochronous transmission of an interface for transmitting digital data bidirectionally.

Furthermore, it is preferable to make the size of the data blocks in the isochronous transmission format of the interface for transmitting digital data bidirectionally in common to each other irrespective of the sampling frequency of the interface for transmitting digital data unidirectionally.

In the present invention, all of the electronic musical instruments connected to the bidirectional digital interface are provided on the transmission side.

BRIEF DESCRIPTION OF THE DRAWINGS

FIG. 5 is a diagram showing general specifications of a CIP header in the IEEE-1394 isochronous data transmission mode;

FIG. 6 is a diagram showing an example of format designation of digital audio, music/musical instrument and so on;

FIG. 9 is a diagram showing an example of data format designation in the present invention;

FIG. 12 is a diagram showing an example of conversion when the sampling frequency of the digital audio interface is 32 kHz in the present invention;

FIG. 13 is a diagram showing an example of an isopacket in the present invention;

FIG. 33 is a diagram showing a format of the MIDI message;

FIG. 34 is a diagram showing types of the MIDI message;

FIG. 37 is a diagram showing data formats of three MIDI messages, a sample dump request, a dump header and a data packet.

DESCRIPTION OF THE PREFERRED EMBODIMENTS

The embodiments of the present invention will be described in detail hereinafter with reference to the drawings. In the following two embodiments, the present invention is applied to IEEE-1394 High Performance Serial Bus (hereinafter referred to as IEEE-1394 serial bus).

The First Embodiment

Figure 1:
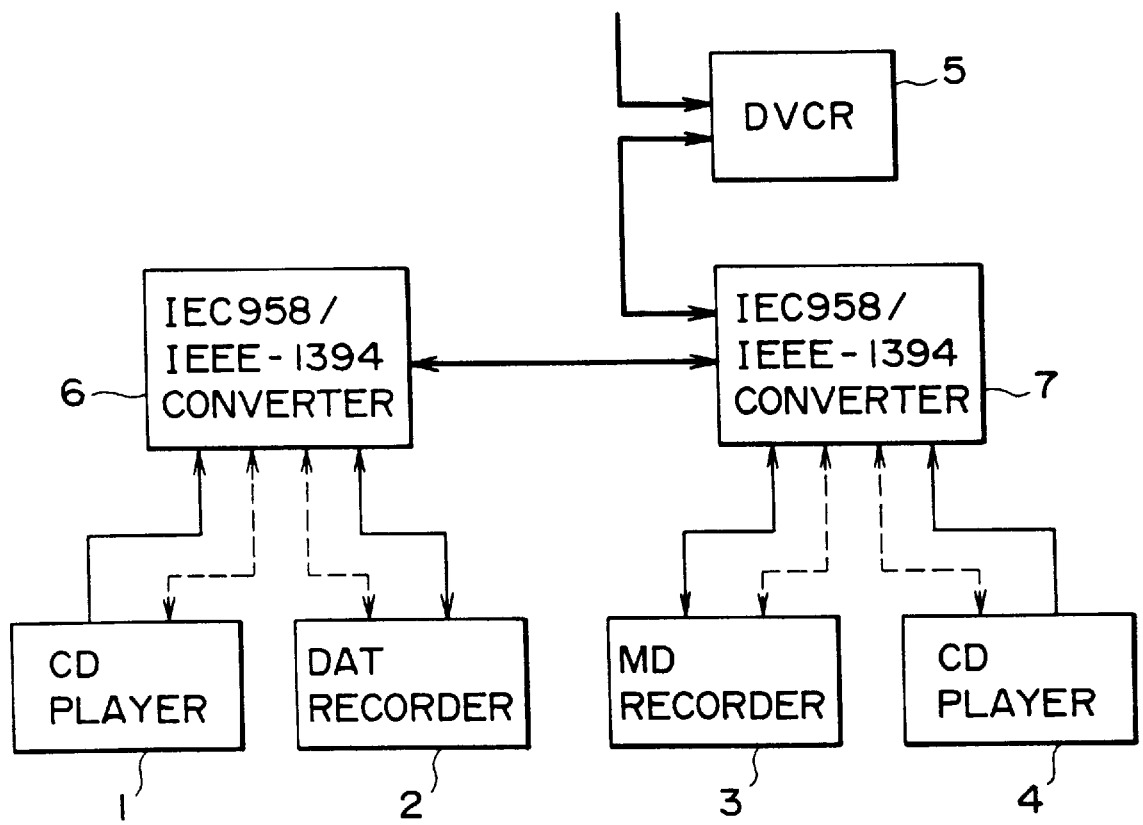
FIG. 1 is a diagram showing a first embodiment of a bidirectional data transmission system applied with the present invention.

A bidirectional data transmission system applied with the present invention is provided with a CD player 1, a DAT recorder 2, an MD recorder 3 and a CD player 4 as digital audio equipments as shown in FIG. 1 for instance. Each of these digital audio equipments is provided with a digital audio interface. Further, the CD player 1 and the DAT recorder 2 are connected to an IEC958/IEEE-1394 converter (hereinafter referred to simply as a converter) 6 by means of signal lines and control buses of digital audio interfaces. Further, the MD recorder 3 and the CD player 4 are connected to a converter 7 by means of signal lines and control buses of digital audio interfaces. Furthermore, the converter 6, the converter 7 and a DVCR (Digital Video Cassette Recorder) 5 are connected to one another by means of the cables of the IEEE-1394 serial buses. The DVCR 5 is provided with a digital interface for the IEEE-1394 serial bus, and is able to transmit/receive a digital audio/video signal without through the converter.

Besides, in the system using the IEEE-1394 serial buses, it is also possible to adopt tree-shaped topology other than cascade-connected bus type topology such as shown in FIG. 1.

The converter 6 and the converter 7 have a function of converting the protocol of the digital audio interface and the protocol of IEEE-1394 to each other. In this case, a digital audio signal conforming to the digital audio interface is transmitted in an IEEE-1394 isochronous mode. The isochronous mode means a mode of transmitting data synchronized with an isochronous cycle of 8 kHz (125 $\mu$s) generated by an apparatus that becomes a cycle master within the data transmission system, and is used for transmitting realtime signal data such as a dynamic image signal, a digital audio signal and a music/musical instrument signal.

The converter 6 and the converter 7 are also provided with a function of converting the protocol of the control bus and the protocol of IEEE-1394 to each other. In this case, a control command of the control bus is transmitted in the IEEE-1394 asynchronous mode. The asynchronous mode is used in recording data in a storage device such as a hard disk drive unit in a mode which is not realtime and in reading the data, and for transmitting a control signal of the apparatus.

Figure 2:
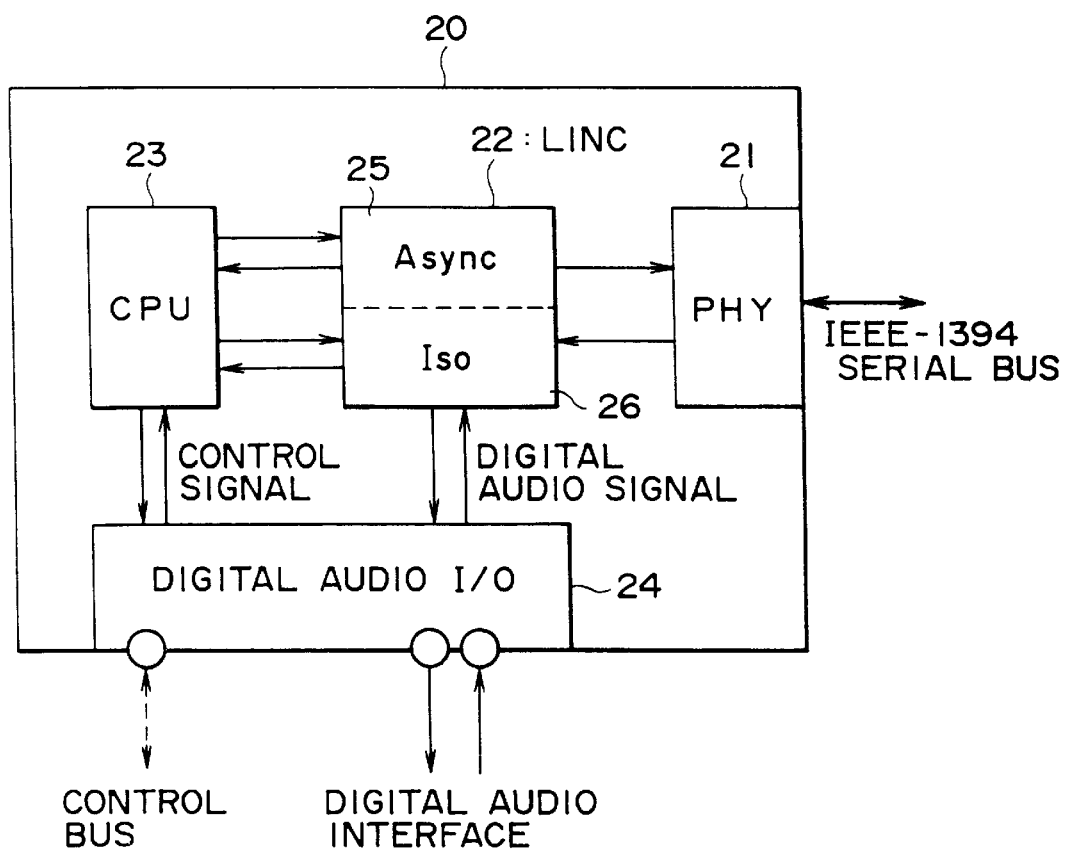
FIG. 2 is a diagram showing a basic structure of a converter in FIG. 1.

FIG. 2 shows a basic structure of the converter. The converter 20 is provided with a physical layer block (PHY) 21 for the IEEE-1394 serial bus, a link layer block (LINC) 22, a CPU 23 and a digital audio I/O 24.

The physical layer block 21 performs physical layer control such as arbitration of the IEEE-1394 serial bus, encode/decode of communication data, and supply of bias voltage. Further, the link layer block 22 is provided with an asynchronous data processing portion 25 and an isochronous data processing portion 26, and performs link layer control such as generation/detection of a packet and generation/detection of header CRC and data CRC. Further, the CPU 23 performs control of an application layer. Further, the digital audio I/O 24 communicates the digital audio signal with the isochronous data processing portion 26 of the link layer block and communicates the control signal with the CPU 23. Furthermore, the digital audio I/O 24 performs buffering of these signals.

In the system shown in FIG. 1 described previously, for example, a digital audio signal regenerated in the CD player 1 is formed into a signal conforming to the digital audio interface and transmitted to a converter 6. In the converter 6, the digital audio signal inputted from the digital audio I/O 24 is sent to the isochronous data processing portion 26 of the link layer block 22, and an isochronous data block packet (hereinafter referred to as an isopacket) of IEEE-1394 is generated here and sent out to the IEEE-1394 serial bus from the physical layer block 21. In the converter 7, the isopacket inputted from the physical layer block 21 is sent to the digital audio I/O 24 through the isochronous data processing portion 26, returned here to a signal conforming to the digital audio interface and sent to the MD recorder 3, and the digital audio signal is recorded here.

Similarly, it also becomes possible to digitally record a digital audio signal regenerated in the CD player 4 in the DAT recorder 2. Furthermore, it also becomes possible to digitally record the signal in a digital audio data recording area of the DVCR 5.

Further, when a control command is transmitted in the system shown in FIG. 1, the control command outputted from the CD player 1 is transmitted to the converter 6 through the control bus. In the converter 6, the control command inputted from the digital audio I/O 24 is sent from the CPU 23 to the asynchronous data processing portion 25 of the link layer block 22, an asynchronous data block packet (hereinafter referred to as an asynchronous packet) of IEEE-1394 is generated here and is sent out to the IEEE-1394 serial bus from the physical layer block 21. In the converter 7, the asynchronous packet inputted from the physical layer block 21 is sent to the digital audio I/O 24 through the asynchronous data processing portion 25 and the CPU 23. Then, it is returned to the command on the control bus and sent to the MD recorder 3, thereby to control the operation thereof.

Figure 3:
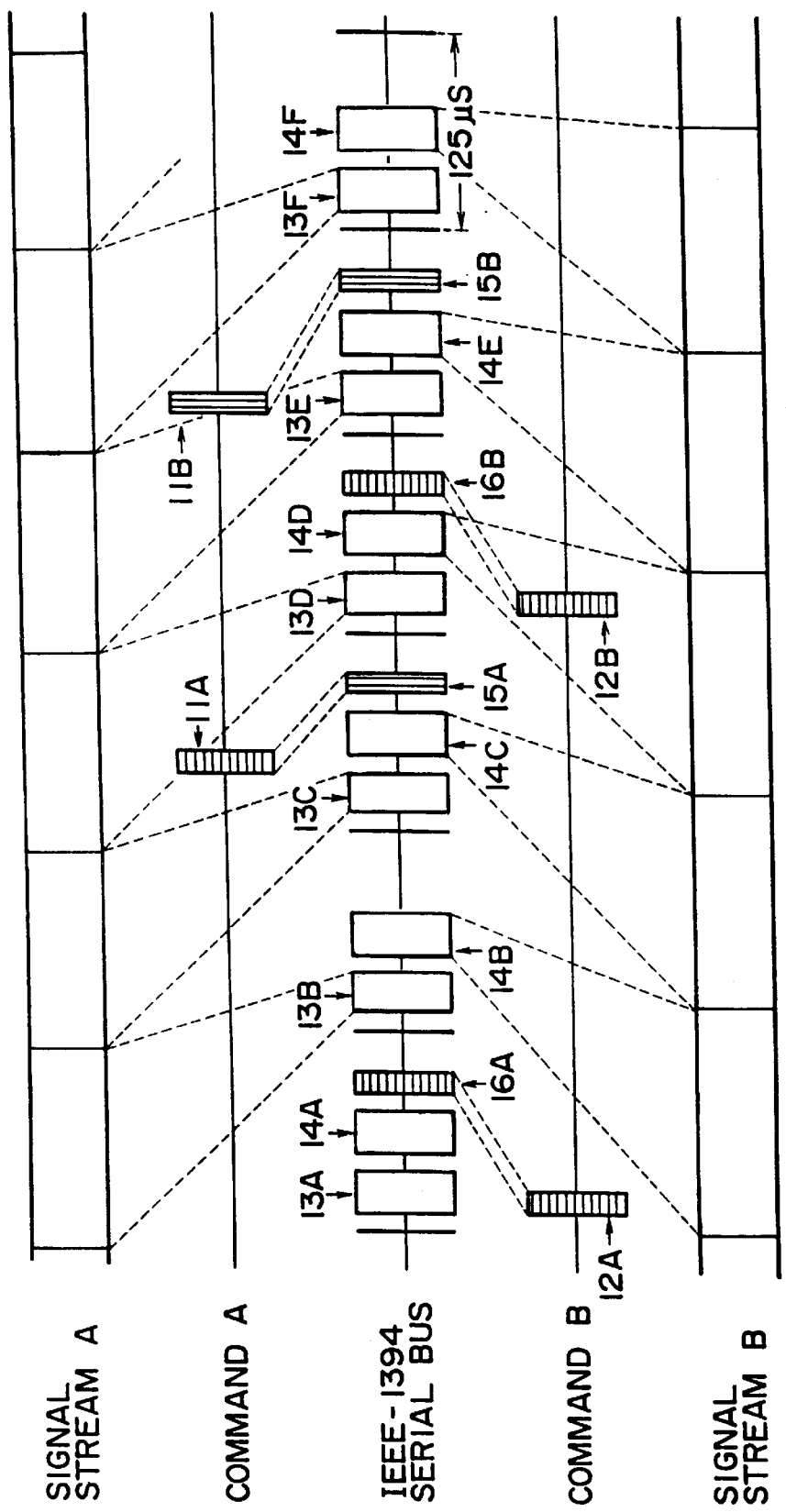
FIG. 3 is a diagram showing an example of isochronous and asynchronous data transmitting configuration in the system shown in FIG. 1.

FIG. 3 shows an example of a timing when a digital audio signal and a control command are transmitted from the CD player 1 to the MD recorder 3, and a digital audio signal and a control command are also transmitted from the DAT recorder 2 to the DVCR 5.

A signal stream A is a digital audio signal transmitted from the CD player 1 to the MD recorder 3, and a signal stream B is a digital audio signal transmitted from the DAT recorder 2 to the DVCR 5. These signal streams A and B are inputted to the converter 6 through the digital audio interface.

Further, 11A and 11B of the command A show examples of a control command exchanged mutually by the CD player 1 and the MD recorder 3. Further, 12A and 12B of the command B show examples of a control command exchanged mutually by the DAT recorder 2 and the DVCR 5. Any of those has been inputted to the converter 6 by the digital audio interface.

The signal streams A and B are transmitted on the IEEE-1394 serial bus in an isochronous cycle of 125 $\mu$s after being converted into isopackets in the converter 6. The data transmission velocity in this case is set to any of 100 Mbps, 200 Mbps or 400 Mbps. In FIG. 3, the signal stream A has been converted into isopackets 13A to 13F, and the signal stream B has been converted into isopackets 14A to 14F.

Further, the commands 11A and 11B have been converted into asynchronous packets 15A and 15B, and the commands 12A and 12B have been converted into asynchronous packets 16A and 16B.

Further, these isopackets and asynchronous packets are time-division multiplexed on the IEEE-1394 serial bus and transmitted. At this time, the isopackets 13A to 13F and 14A to 14F are transmitted using different channels. The equipment on the IEEE-1394 looks at a channel number written on a header (details thereof being described later) of an isopacket and takes in necessary isopackets. Further, the asynchronous packets 15A and 15B and the asynchronous packets 16A and 16B have originating equipment addresses and destination equipment addresses. Besides, since the details of data transmission control on such an IEEE-1394 serial bus have been opened to the public in the specification of IEEE-1394, no description is made here.

The isopackets and asynchronous packets transmitted on the IEEE-1394 serial bus are inputted to the converter 7. The isopackets 13A to 13F are returned to the original signal stream A, and sent to the MD recorder 3 through the digital audio interface. Further, the asynchronous packets 15A and 15B are also returned to the original commands 11A and 11B and sent to the MD recorder 3 through the control buses.

On the other hand, isopackets 14A to 14F are sent to the DVCR 5 as they are through the IEEE-1394 serial bus and taken therein. Similarly, the asynchronous packets 16A and 16B are also sent to the DVCR 5 as they are through the IEEE-1394 serial bus and taken therein.

Next, a method of placing a digital audio signal conforming to the digital audio interface on an isopacket of IEEE-1394 will be described in detail.

Figure 4:
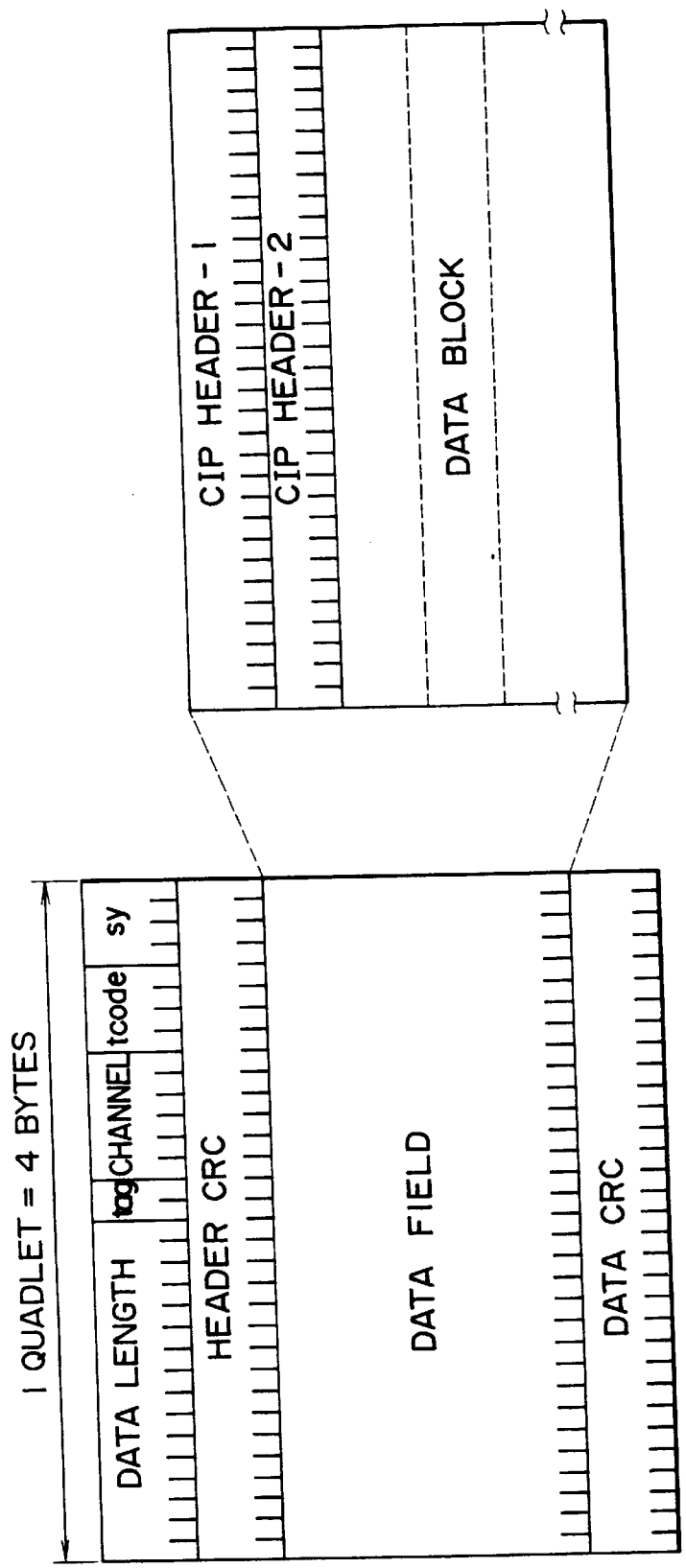
FIG. 4 is a diagram showing a format of an isochronous packet of IEEE-1394.

FIG. 4 shows an isopacket of IEEE-1394. A data block packet of IEEE-1394 is expressed in the unit of 32 bits (hereinafter referred to as a quadlet). The channel located in the first quadlet shows the asynchronous channel number. The isochannel can be identified by the 6 bits 64 channel. When two bits in a tag field are $01_2$, a common isochronous packet header (hereinafter referred to as a CIP header) of such two quadlets is inserted at the head of the data field. For the purpose of handling realtime data of a digital audio video signal of a digital video equipment, a digital audio equipment or the like, the value of the tag is set to $01_2$. The configuration of the present embodiment relates to the case of tag=$01_2$. Besides, when tag=$00_2$, it is not required to insert the CIP header.

FIG. 5 shows a CIP header when the value tag=$01_2$ is set. In the first quadlet of the CIP header, assignment of bits remains unchanged depending on the format. A source node ID (hereinafter referred to as an SID) represents a node ID on the IEEE-1394 serial bus of the equipment which sends out an isopacket. A data block size (hereinafter referred to as a DBS) is a number representing a length of the data block with quadlet. A fraction number (hereinafter referred to as an FN) is the number of data blocks where a source packet is divided. A quadlet padding count (hereinafter referred to as a QPC) is used when the FN shows a value other than $00_2$. A source packet header (hereinafter referred to as an SPH) is set to $1_2$ when the source packet has an original source header. A data block counter (hereinafter referred to as a DBC) is a continuous counter in 8 bits and is used for detecting transmission off of the source packet. A format ID field (hereinafter referred to as an FMT) in the second quadlet of the CIP header is used for identification of a format transmitted by the IEEE-1394 serial bus. The specifications of a format dependent field (hereinafter referred to as an FDF) are determined by the FMT.

FIG. 6 shows an allocation example of the FMT. As shown in FIG. 6, the formats of DVCR signal transmission and MPEG signal transmission are designated at FMT=$000000_2$ and $000001_2$, respectively. Further, transmission formats are designated for non-compressed digital audio (hereinafter referred to as linear audio) with FMT=$000010_2$, bit compressed digital audio (hereinafter referred to as nonlinear audio) with $000011_2$, and music/musical instrument with $000100_2$. When FMT=$111110_2$, specifications original to manufacturers are acknowledged within the prescribed range of the CIP header. Further, when FMT= $111111_2$, prescriptions of respective fields DBS, FN, QPC, SPH and DBC are canceled.

Figure 7:
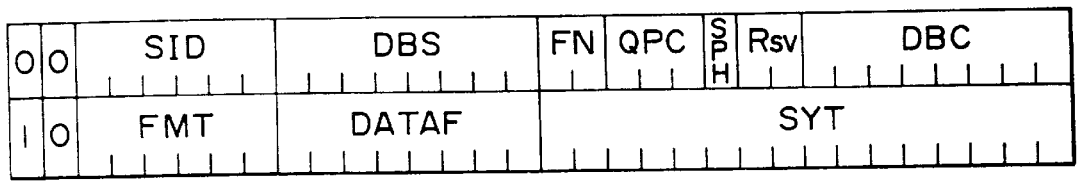
FIG. 7 is a diagram showing an example of a CIP header in the present invention.

FIG. 7 shows a CIP header common to linear audio, nonlinear audio and music/musical instrument. The format of this header is formed by dividing the FDF shown in FIG. 5 into a data format field (hereinafter referred to as DATAF) and synchronous time (hereinafter referred to as SYT). By making the data transmission formats of the digital audio allocated with FMT and the music/musical instrument common to each other, common transmission on the IEEE-1394 serial bus becomes easier.

Figure 8:
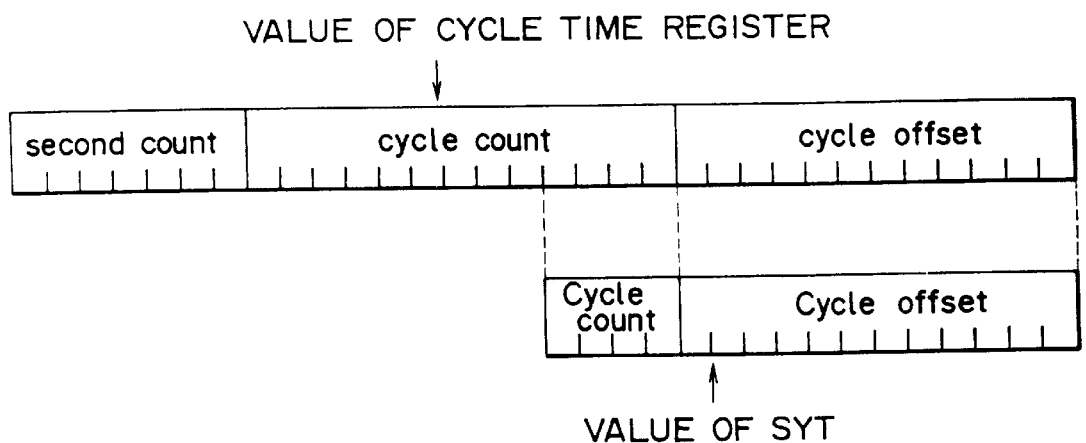
FIG. 8 is a diagram showing an example of SYT in the present invention.

FIG. 8 shows a structure of the SYT. When a time stamp value is given, 16 bits of the SYT are divided into 4 bits of Cycle count and 12 bits of Cycle offset. In this cycle count, a value of 4 bits in the low positions of 13 bits of the cycle count of a cycle time register provided in a cycle master on the IEEE-1394 serial bus is used. For 12 bits of the cycle offset, the value of 12 bits of the cycle offset of the cycle time register is used as it is.

FIG. 9 shows a bit allocation example of the DATAF of linear audio. In FIG. 9, an asynchronous mode is a transmission mode utilizing time stamp of the SYT without synchronizing with the cycle of 125 $\mu$s in an isochronous mode. This mode is used for converting a digital audio interface signal of an equipment which does not synchronize with an external clock in general such as a CD player for consumers into the IEEE-1394 format.

The synchronous mode is a mode of transmission synchronizing with the isochronous cycle of 125 $\mu$s, and is used for an equipment capable of synchronizing with an external clock of a CD player and a recorder for business purposes.

The specifications of Raw audio are used when the equipment having no I/O terminals of the digital audio interface transmits a digital audio signal independent of the format on the IEEE-1394 serial bus.

In the configuration of the present embodiment, the signal stream of the digital audio interface is divided into the units of block so as to obtain a source packet, which is transmitted with a header attached thereto. In the digital audio interface, three types of sampling frequencies (hereinafter referred to as Fs) 48 kHz, 44.1 kHz and 32 kHz are specified. Since one block of the digital audio interface consists of 192 frames, the length of one block in respective Fs is as follows.

Fs: 48 kHz . . . 192÷48 kHz=4 ms
Fs: 44.1 kHz . . . 192÷44.1 kHz=4.35374 ms
Fs: 32 kHz . . . 192÷32 kHz=6 ms

Accordingly, the number of isopackets in each Fs included in one block at the largest is as follows.

Fs: 48 kHz . . . 4 ms÷125 $\mu$s=32
Fs: 44.1 kHz . . . 4.35374 ms÷125 $\mu$s=approx. 35
Fs: 32 kHz . . . 6 ms÷125 $\mu$s=48

In the configuration of the present embodiment, the number of isopackets including data is set to 24 in one block irrespective of the value of Fs. Further, with respect to other isopackets, a packet with a header only having no source packet (hereinafter referred to as a dummy packet) is transmitted.

Since the bit number of the data in one block is 64 bits×192=12,288 bits, the bit number of data in an effective packet is 12,288 bits÷24=512 bits. When this figure is converted into quadlet, 16 quadlets are obtained, and DBC= 16=$00010000_2$ is obtained. 16 quadlets correspond to 16 subframes' portion, i.e., 8 frames' portion of the digital audio interface.

Figure 10:
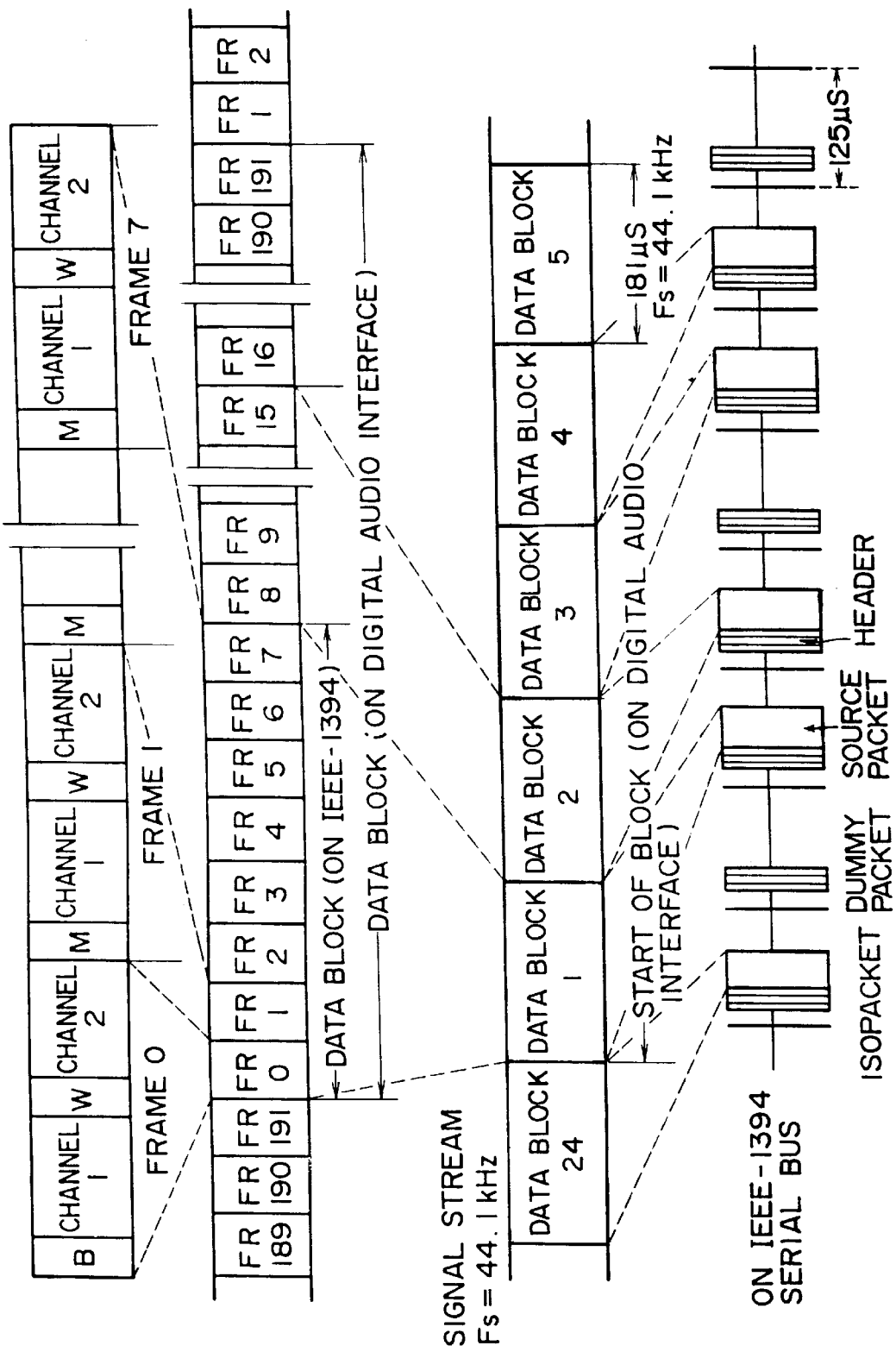
FIG. 10 is a diagram showing an example of conversion when the sampling frequency of the digital audio interface is 44.1 kHz in the present invention.

FIG. 10 shows an example of transmitting an isopacket with these 8 frames as one unit. When the time required for 8 frames' data to be stored in a buffer in a converter is calculated with respect to each Fs, the following is obtained.

Fs: 48 kHz . . . 8÷48 kHz=166.7 $\mu$s
Fs: 44.1 kHz . . . 8÷44.1 kHz=181.4 $\mu$s
Fs: 32 kHz . . . 8÷32 kHz=250 $\mu$s

As shown in FIG. 10, in the case of Fs=44.1 kHz, there are approximately 35−24=11 dummy packets during transmission of one block, and one dummy packet is transmitted after almost effective two packets are transmitted.

Figure 11:
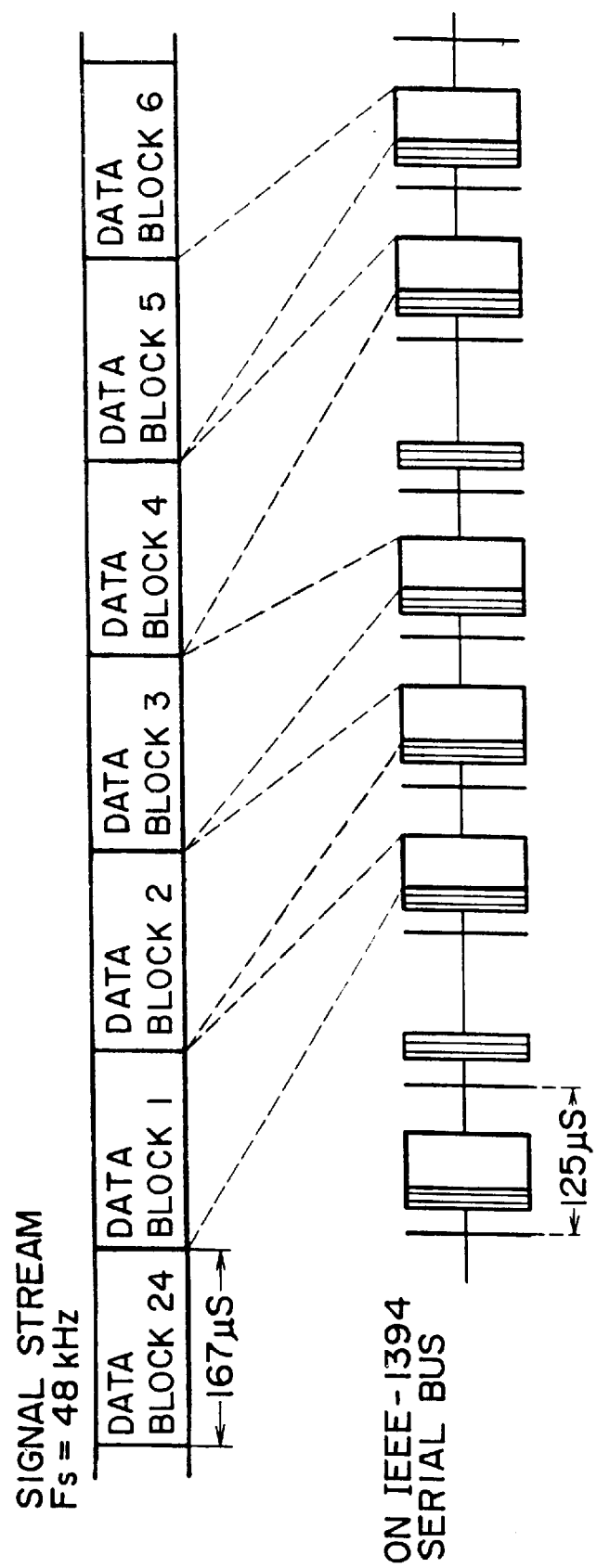
FIG. 11 is a diagram showing an example of conversion when the sampling frequency of the digital audio interface is 48 kHz in the present invention.

Further, when Fs is 48 kHz, there are 32−24=8 dummy packets while one block is transmitted as shown in FIG. 11, and one dummy packet is transmitted after approximately three effective packets are transmitted.

Similarly, when Fs is 32 kHz, 48−24=24 dummy packets are transmitted while one block is transmitted as shown in FIG. 12, and almost effective packets and dummy packets are transmitted alternately.

FIG. 13 shows an example of a format of an isopacket. As shown in FIG. 13, the contents of the subframe 32 bits of the digital audio interface are transferred to the isopacket as they are. However, four bit portion of synchronization and preamble is converted into:

| B:LSB | 11 ** MSB |
|-------|-----------|
| M:LSB | 01 ** MSB |
| W:LSB | 00 ** MSB |

Here, $00_2$ is normally inserted into . It is possible to add up the audio data of 20 bits, auxiliary data of 4 bits and , thereby to use them as audio data of 26 bits.

Figure 27:
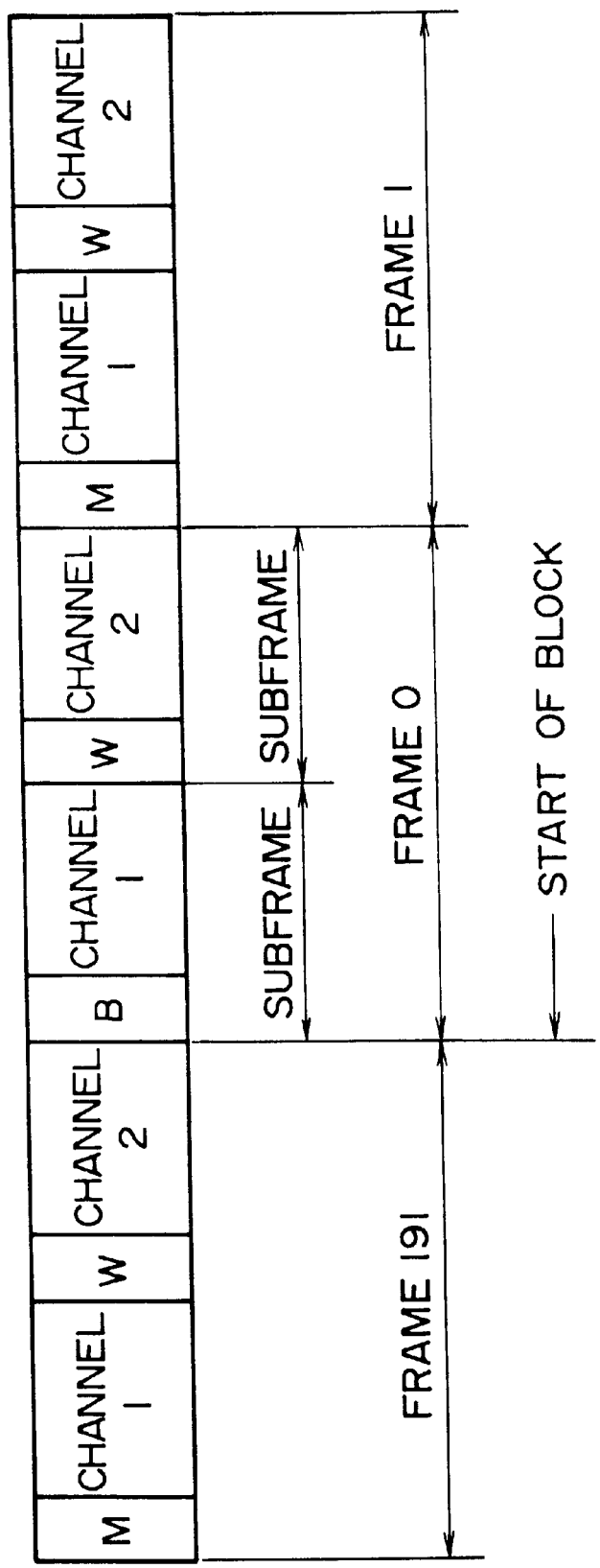
FIG. 27 is a diagram showing a structure of subframes, frames and blocks of a digital audio interface.
Figure 28:
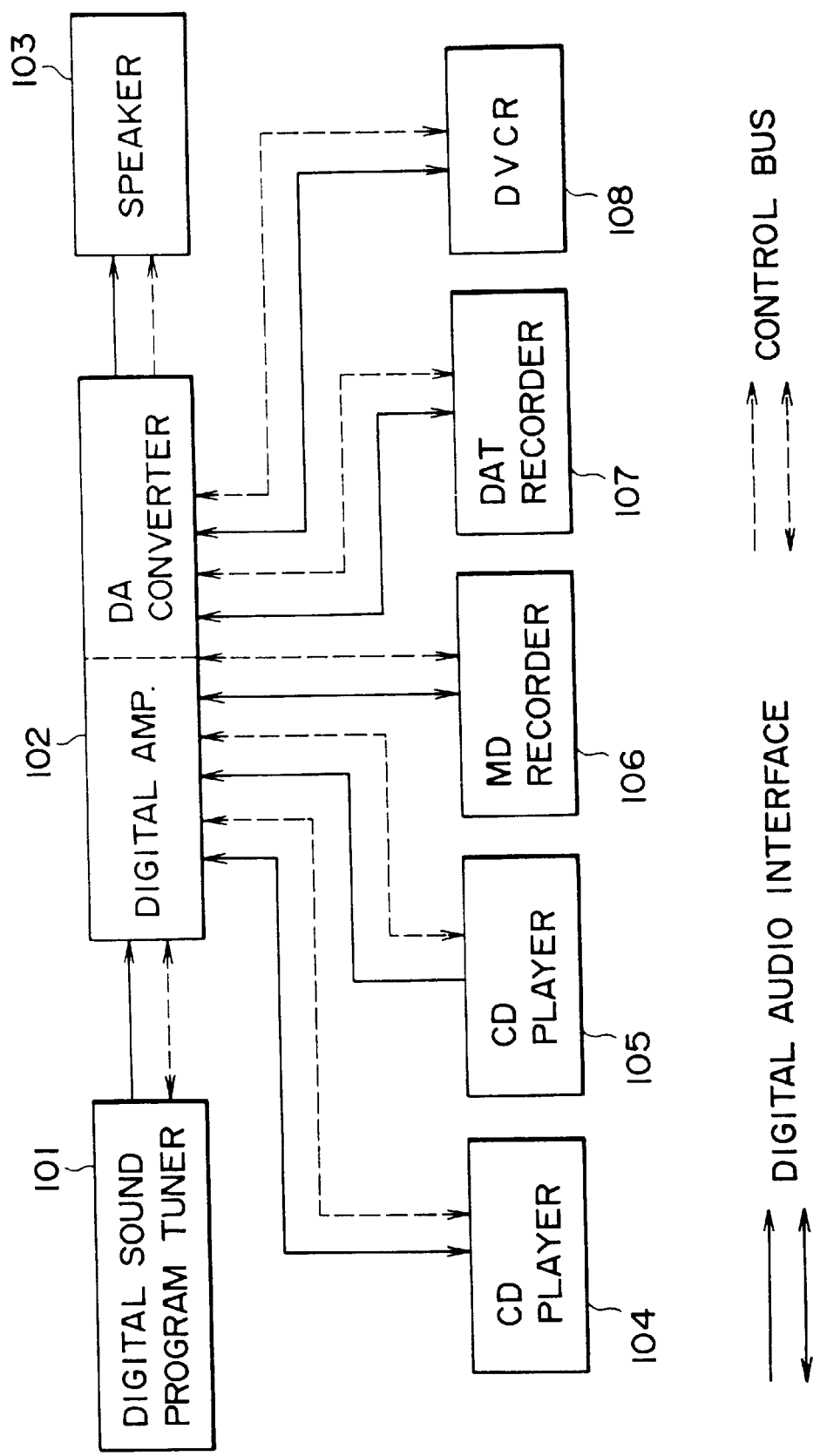
FIG. 28 is a diagram showing an example of a system in which a plurality of audio equipments and video equipments are connected concentratedly to a digital amplifier.
Figure 29:
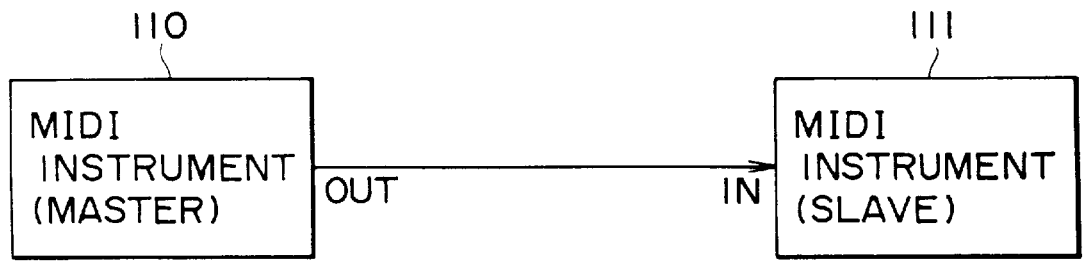
FIG. 29 is a diagram showing an example of connection of electronic musical instruments according to MIDI standards.

As shown in FIG. 13 and FIG. 10, in the configuration of the present embodiment, the data portion of one isopacket is transmitted with 8 frames as the unit in transmission of a signal of the digital audio interface. As shown in FIG. 27, the first quadlet of the data portion is B or M, and the data portion does never start from W. Further, B is positioned at the first quadlet of the data portion, and will never be positioned midway of the data portion. Although the audio data are transmitted starting from the LSB first, it may be arranged so as to transmit starting from the MSB first.

The Second Embodiment

Figure 14:
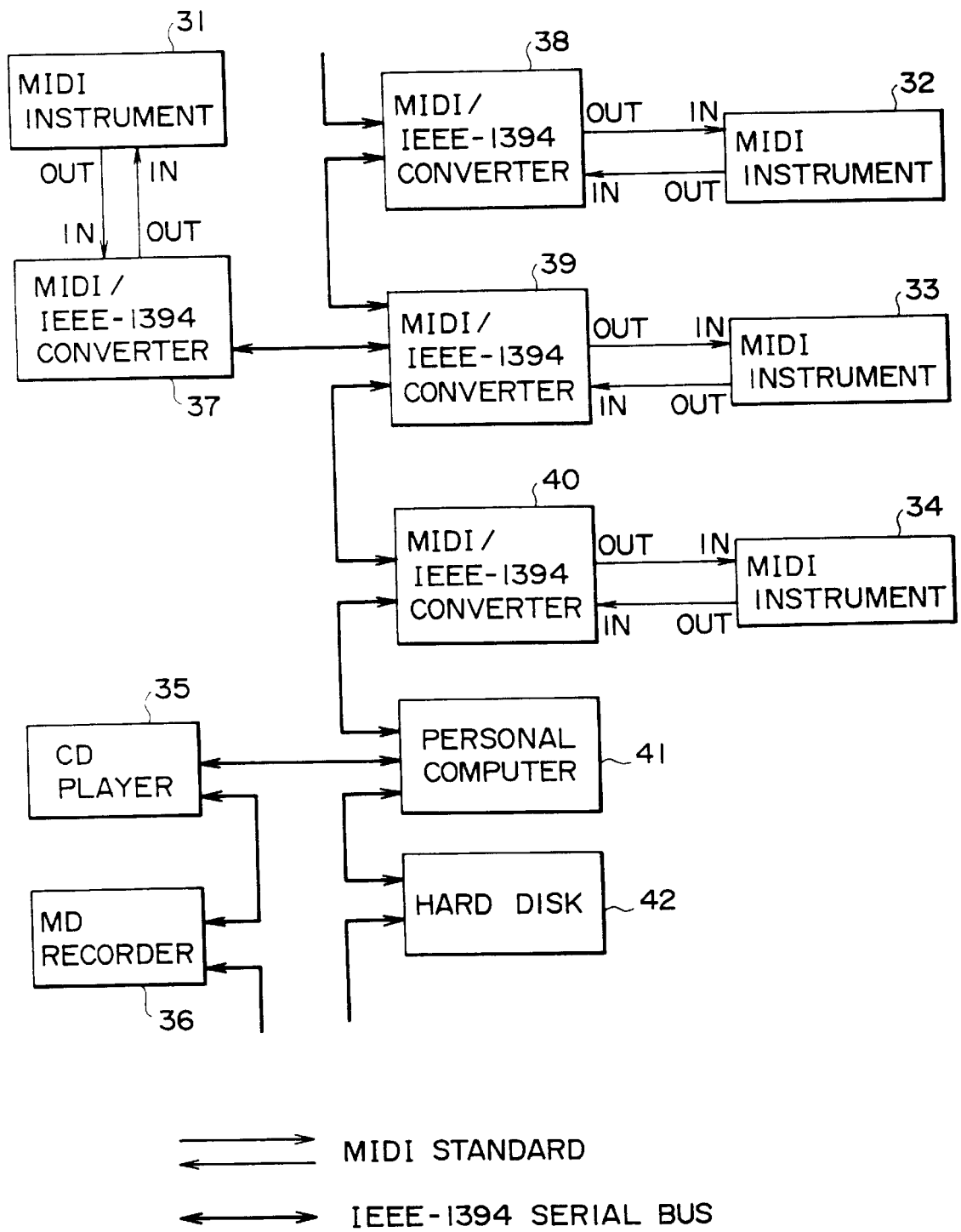
FIG. 14 is a diagram showing a second embodiment of a bidirectional data transmission system applied with the present invention.

A second embodiment of a bidirectional data transmission system applied with the present invention is shown in FIG. 14. In this data transmission system, there are provided MIDI musical instruments 31 to 34, a CD player 35, an MD recorder 36, MIDI/IEEE-1394 converters (hereinafter referred to simply as converters) 37 to 40, a personal computer 41 and a hard disk unit 42.

Then, OUTs of the MIDI musical instruments 31 to 34 are connected to INs of the converters 37 to 40, by MIDI cables, respectively, and INs of the MIDI musical instruments 31 to 34 are connected to OUTs of the converters 37 to 40 by MIDI cables, respectively.

Further, the converters 37 to 40, the CD player 35, the MD recorder 36, the personal computer 41 and the hard disk unit 42 are connected in common with one another by the IEEE-1394 serial bus. In a word, these equipments have the nodes ID on the IEEE-1394 serial bus.

The converters 37 to 40 performs mutual conversion between the MIDI signal and the protocol of the IEEE-1394 serial bus. For example, a MIDI signal inputted to IN of the converter 37 from OUT of the MIDI musical instrument 31 is converted into the IEEE-1394 isopacket or asynchronous packet in the converter 37 and is sent out to the IEEE-1394 serial bus. Conversely, a packet which has been sent out to the IEEE-1394 serial bus from another MIDI musical instrument through another converter and received by the converter 37 is converted here into the MIDI signal and sent from OUT to IN of the MIDI musical instrument 31.

The CD player 35 and the MD recorder 36 are provided with the digital audio interface and the IEC958/IEEE-1394 converter shown in FIG. 2 and capable of mutual conversion between protocols inside. Accordingly, it is possible to transmit/receive the isopacket and the asynchronous packet directly with respect to the IEEE-1394 serial bus. Besides, similarly to FIG. 1, the IEC958/IEEE-1394 converter may be installed outside the CD player 35 and the MD recorder 36.

The personal computer 41 and the hard disk unit 42 are provided with the digital interface (the physical layer block and the link layer block shown in FIG. 2) for the IEEE-1394 serial bus, and are able to transmit/receive the isopacket and the asynchronous packet directly with respect to the IEEE-1394 serial bus.

According to the bidirectional communication system structured as described above, the performance information of the MIDI musical instruments 32 to 34 outputted from the MIDI musical instrument 31 is converted into the protocol of the IEEE-1394 serial bus by means of the converter 37 and sent out to the IEEE-1394 serial bus. Then, the performance information is inverted into the performance information of the MIDI musical instruments 32 to 34 in the converters 38 to 40, and is inputted to INs of respective MIDI musical instruments 32 to 34. With this, it is possible to play the MIDI musical instruments 31 to 34 at the same time.

Further, performance information, control information or the like of the MIDI musical instrument can be recorded/reproduced in the hard disk unit 42. Furthermore, it is also possible to perform on-screen display on the display of the personal computer 41.

Further, it is possible to synthesize the performance information outputted by the MIDI musical instrument and the reproduced digital audio signal of the CD player and record it in the MD recorder 36 or the hard disk unit 42.

Figure 16:
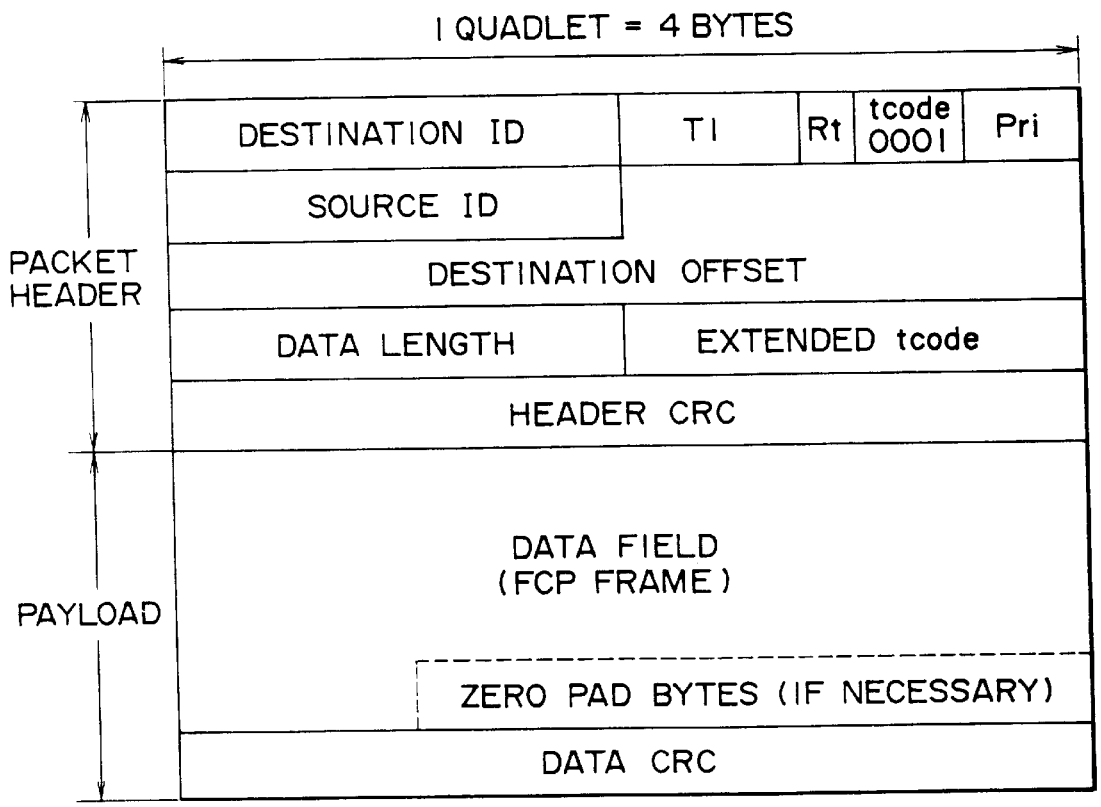
FIG. 16 is a diagram showing a write request for data block packet in the IEEE-1394 asynchronous data transmission mode.
Figure 17:
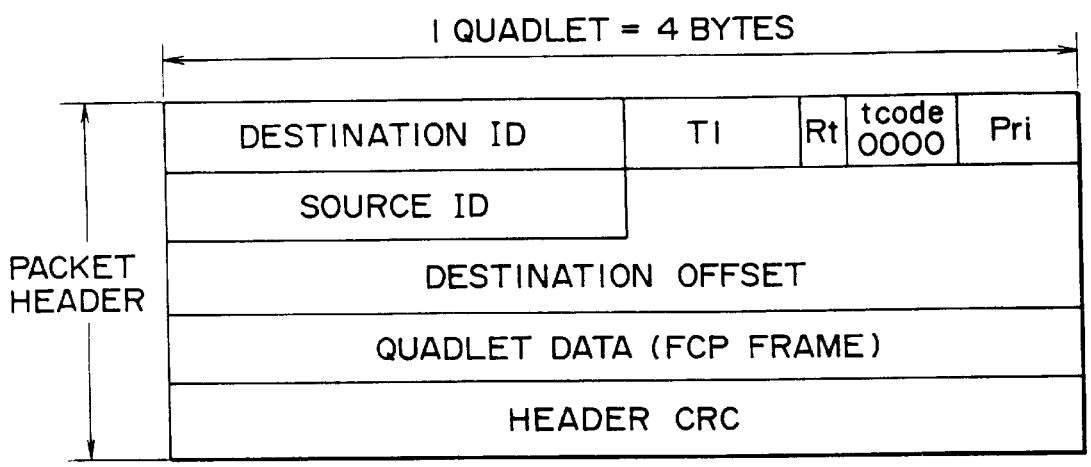
FIG. 17 is a diagram showing a write request for data quadlet packet in the IEEE-1394 asynchronous data transmission mode.
Figure 30:
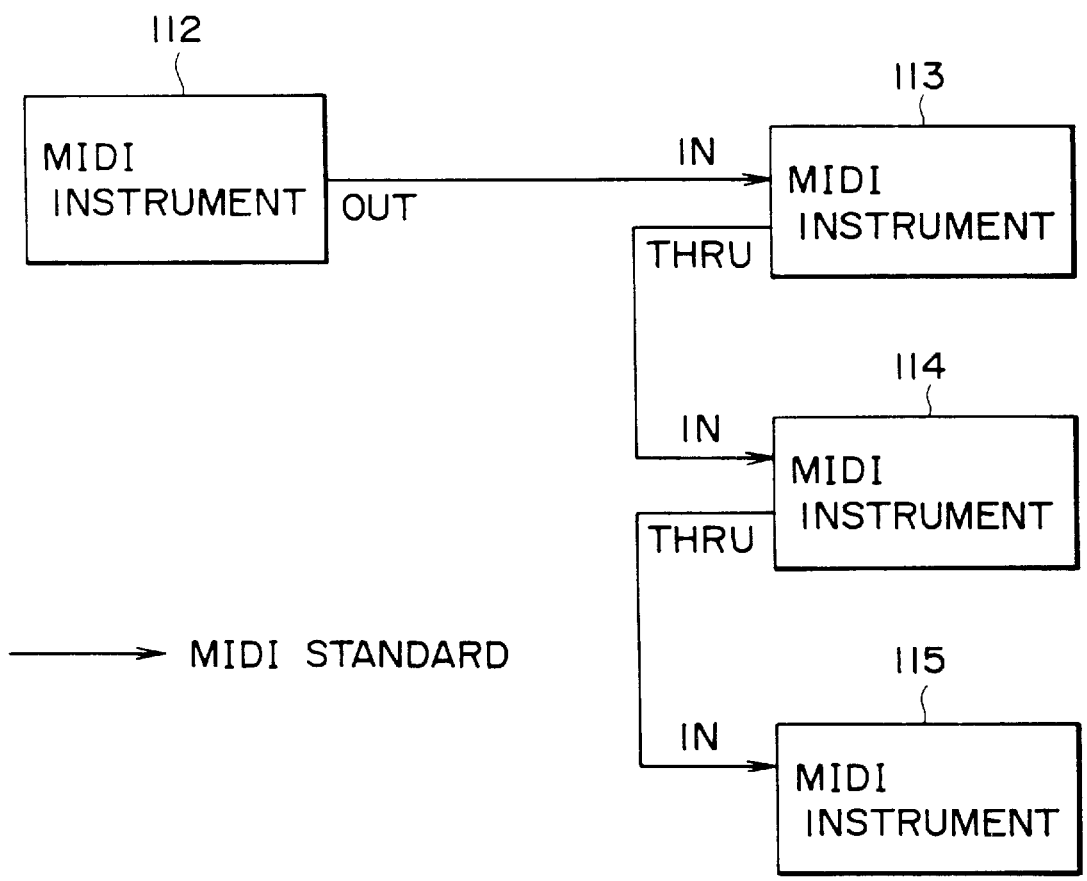
FIG. 30 is a diagram showing an example of connecting MIDI musical instruments in a cascade form.
Figure 31:
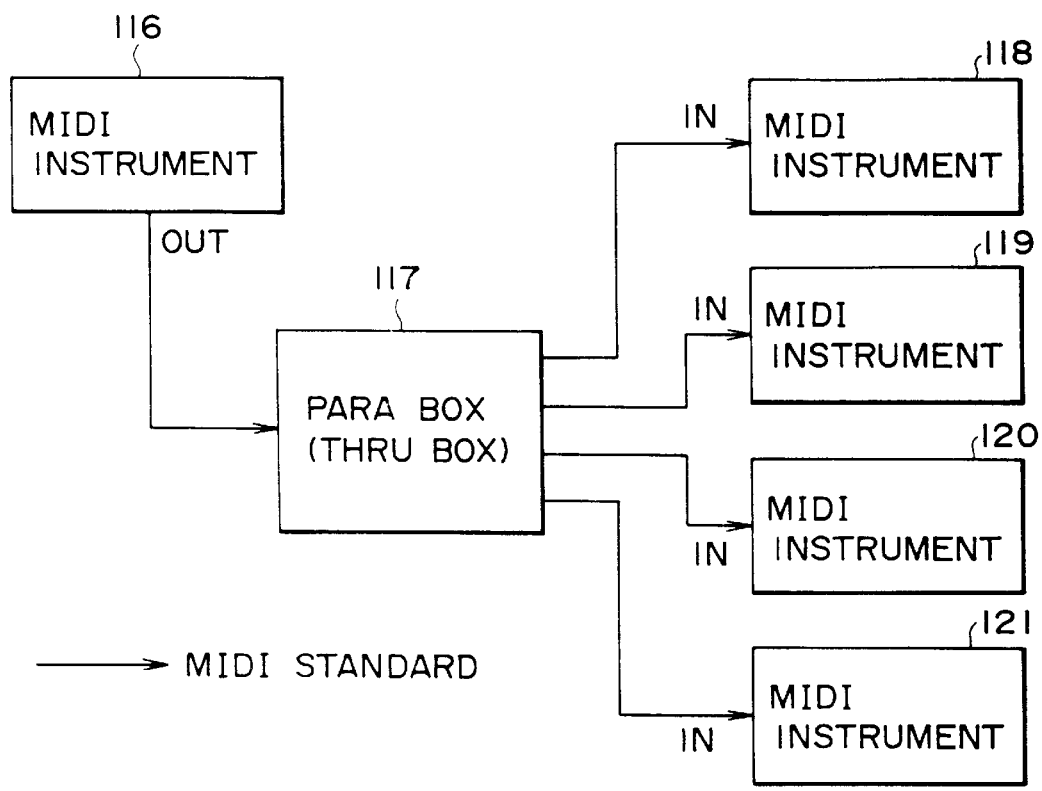
FIG. 31 is a diagram showing an example of connecting MIDI musical instruments in a tree form through the THRU box.
Figure 32:
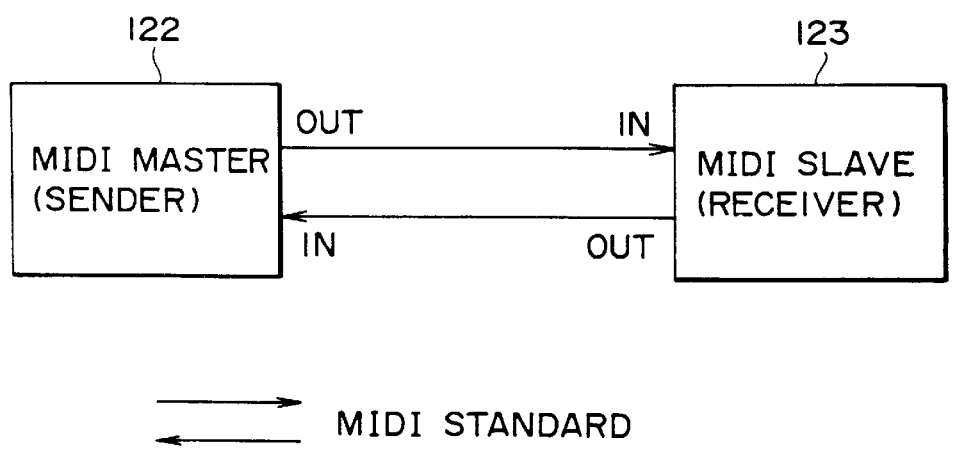
FIG. 32 is a diagram showing that handshakes transmit in the MIDI musical instrument.

In FIG. 14, the converters 37 to 40 have IDs on the IEEE-1394 serial bus, and it is possible to judge which MIDI musical instrument is transmitting the MIDI message by using the ID number for the source ID of the asynchronous packet (FIG. 16 and FIG. 17 described later). Namely, in the structure shown in FIG. 14, any of the MIDI musical instruments can be operated as the master, and it is not required to fix connection as shown in FIG. 30 or FIG. 31, but other MIDI musical instruments can be played from any keyboard.

Figure 15:
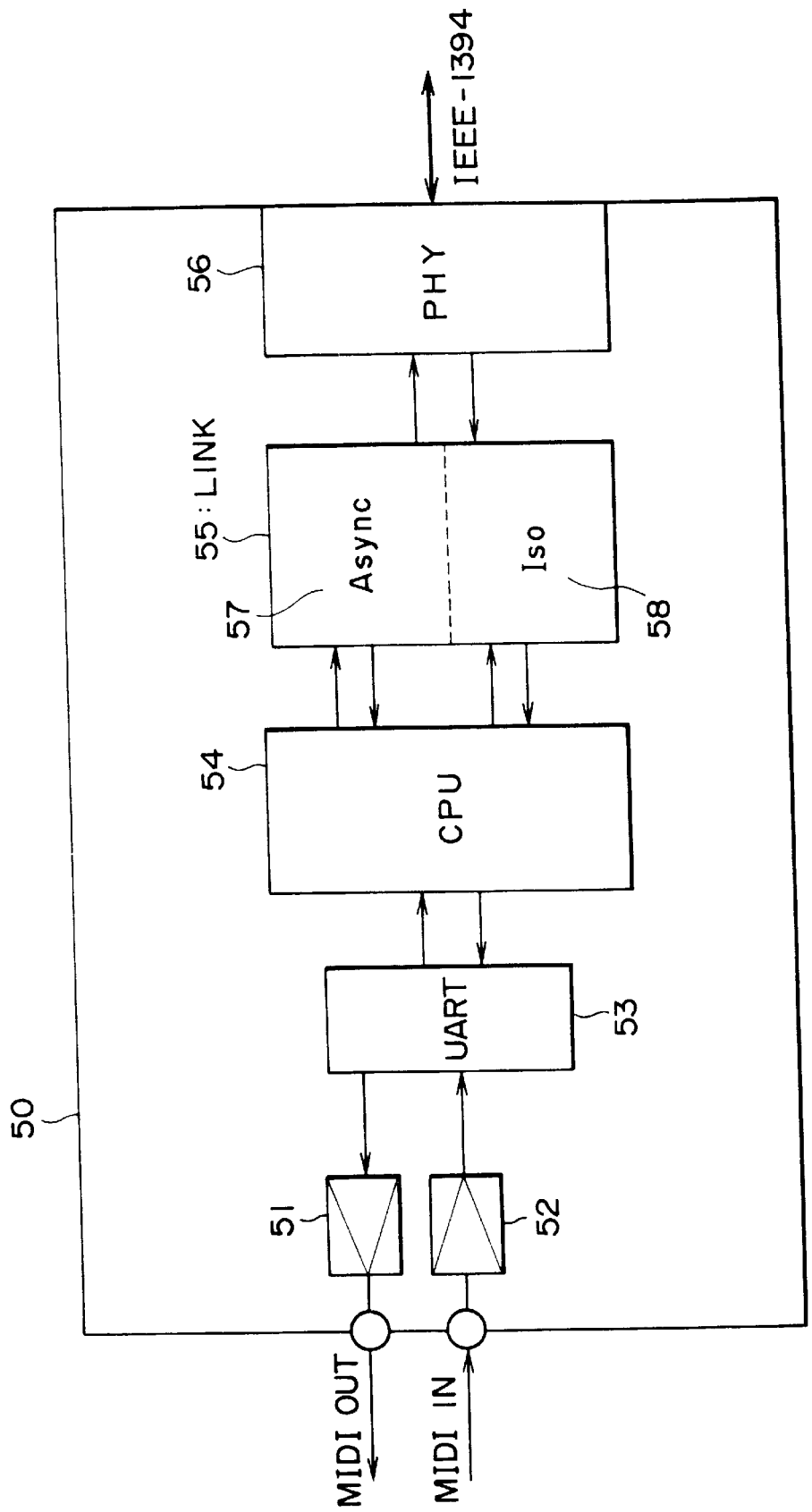
FIG. 15 is a diagram showing a basic structure of the converter shown in FIG. 14.

FIG. 15 shows an example of a converter between MIDI standards and the IEEE-1394 serial bus format. This converter is composed roughly of a transmitter-receiver portion of the MIDI message, a digital interface for the IEEE-1394 serial bus and a CPU 54.

The transmitter/receiver portion of the MIDI message is composed of a buffer 51 of the MIDI message to be outputted to the MIDI OUT terminal, a buffer 52 of the MIDI message inputted from the MIDI IN terminal, and a Universal Asynchronous Receiver/Transmitter (UART) 53.

The digital interface to the IEEE-1394 serial bus is composed of a link layer block 55 and a physical layer block 56. These blocks are structured similarly to corresponding blocks in FIG. 2.

The MIDI message outputted from the CPU 54 is converted into asynchronous serial data in the UART 53 and outputted onto the MIDI cable from MIDI OUT through the buffer 51. Further, the MIDI message inputted from MIDI IN is converted into parallel data in the UART 53 through the buffer 52 and inputted to the CPU 54.

When the MIDI message is transmitted being loaded on the asynchronous packet, the MIDI message outputted from the CPU 54 is sent to an asynchronous data processing portion 57, and sent out therefrom to the IEEE-1394 serial bus through the physical layer block 56. Then, when the MIDI message is transmitted being loaded on the isopacket, the MIDI message outputted from the CPU 54 is sent to an isochronous data processing portion 58, and sent out therefrom to the IEEE-1394 serial bus through the physical layer block 56.

Next, a method of loading the music/musical instrument signal conforming to MIDI standards on the asynchronous packet of the IEEE-1394 serial bus will be described.

The music/musical instrument signal is transmitted here using a function control protocol (hereinafter referred to as FCP) of IEEE-1394. The FCP is a protocol for controlling the equipments connected to the IEEE-1394 serial bus, and transmits a control command and a response by the asynchronous packet.

FIG. 16 shows a write request for data block packet in the asynchronous data transmission mode of IEEE-1394, and FIG. 17 shows a write request for data quadlet packet. The payload of these two packets is called an FCP frame. When the length of the FCP frame is 4 bytes (=1 quadlet), the "write request for data quadlet" is used. The source ID and the destination ID are addresses of the originating origin and destination of the asynchronous packet.

Figure 18:
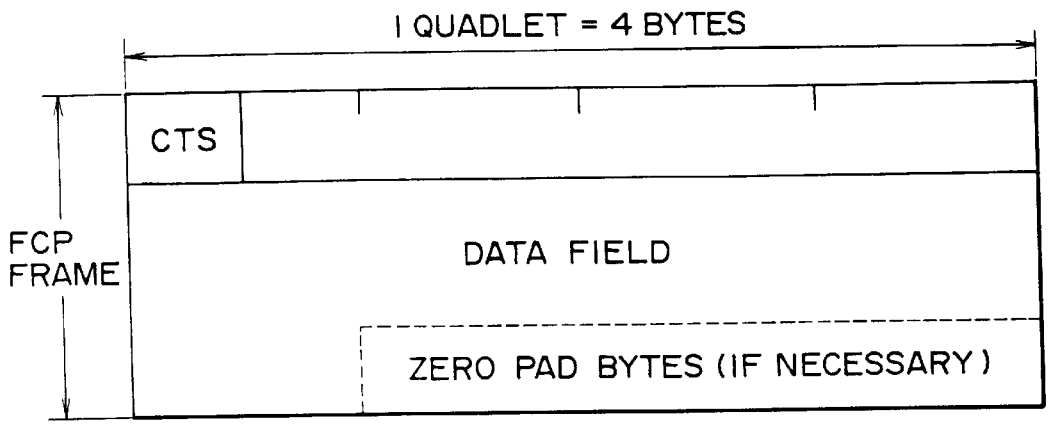
FIG. 18 is a diagram showing a structure of an FCP frame in an asynchronous data transmission mode of the IEEE-1394 serial bus.

FIG. 18 shows a structure of the FCP frame in the asynchronous data transmission mode of the IEEE-1394 serial bus. Four bits at the head of the FCP frame form a command transaction set (hereinafter referred to as CTS), and CTS=$0000_2$ is allocated for controlling audio/video equipments (hereinafter referred to as AV equipments). The CTS is followed by command type/response code (hereinafter referred to as CT/RC) in 4 bits, header address (hereinafter referred to as HA) in 8 bits, OPC in 8 bits, OPR 1 in 8 bits, OPR 2 in 8 bits and so on.

Figure 19:
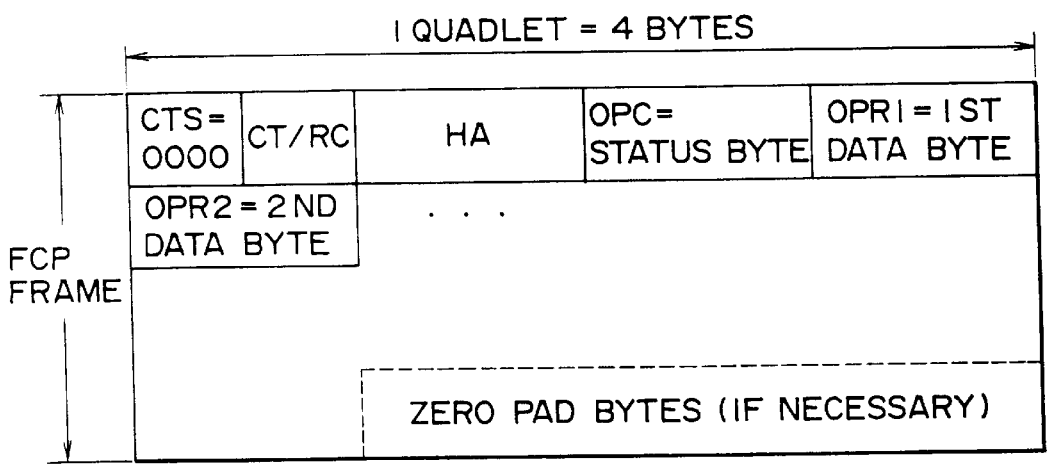
FIG. 19 is a diagram showing an example of a data structure for transmitting the MIDI message in the FCP frame when $CTS=0000_2$.

FIG. 19 shows an example of a data structure for transmitting the MIDI message in the FCP frame when CTS=$0000_2$. Four bits of CT/RC represent the types of command and response. When the MSB of 4 bits is "0", that frame is the command frame, and it is the response frame in the case of "1". The specifications of this CT/RC apply correspondingly to the specifications for controlling AV equipments.

A type code and a subdevice number of a subdevice prescribed in the IEC publication 1030 (hereinafter referred to as IEC-1030) for instance can be used for 8 bits of HA. MSB 5 bits show the subdevice type and LSB 3 bits show the subdevice number. As to the subdevice type, a video monitor, an audio amplifier or the like are allocated for AV equipments. It is possible to use the subdevice type of an audio effects unit ($10100_2$) for instance as a music/musical instrument. The subdevice number is used for distinguishing between two decks when a plurality of same subdevices are provided in one set of equipment like a double-cassette deck for instance.

A status byte of the MIDI message is put in 8 bits of OPC, a data byte of the first MIDI message is put in the bits of OPR 1, and the second data byte is put in 8 bits of OPR 2. In IEC-1030, the MSB of OPC is "1" and the MSB of OPR is "0", thus making it possible to maintain the relationship between the status byte and the data byte of the MIDI message.

In the present embodiment, transmission is made in the asynchronous data transmission mode except a system exclusive message of the MIDI message.

Figure 20:
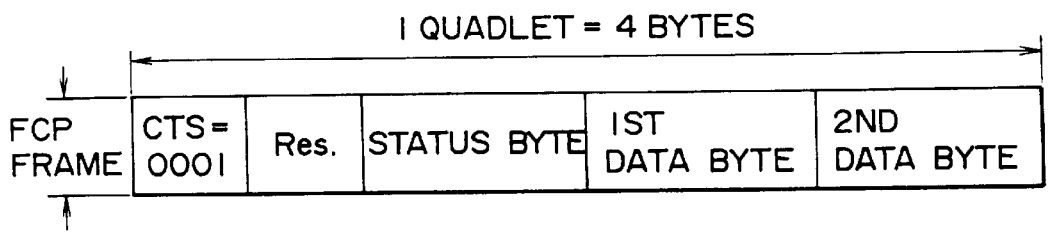
FIG. 20 is a diagram showing another example of the FCP frame.

FIG. 20 shows another example of the FCP frame. In the present embodiment, a code exclusive for music/musical instrument (such as $0001_2$) is allocated to the CTS. The specifications of CT/RC may apply correspondingly to the case of CTS=$0000_2$. Since music/musical instrument messages are designated in CTS, it is not required to designate the subdevice in HA as shown in FIG. 19. Therefore, the status byte is placed at the position of HA, and data bytes follow thereafter for two bytes at the maximum. Since the message is kept within 4 bytes except the system exclusive message, it is transmitted in the "write request for data quadlet" packet. It is possible to transmit the system exclusive message in the isochronous data transmission mode similarly to the previous example, and also to transmit it in the asynchronous data transmission mode by the write request for data block packet.

The destination ID shown in FIG. 16 and FIG. 17 is able to designate the ID of the converter connected to a specific musical instrument when the number of musical instruments in the communication system is small. On the other hand, the number of equipments that can be connected directly to the IEEE-1394 serial bus is 63 units, and, when MIDI messages having the same contents are transmitted to a plurality of MIDI musical instruments, Broadcast ID is designated in the destination ID.

Figure 35:
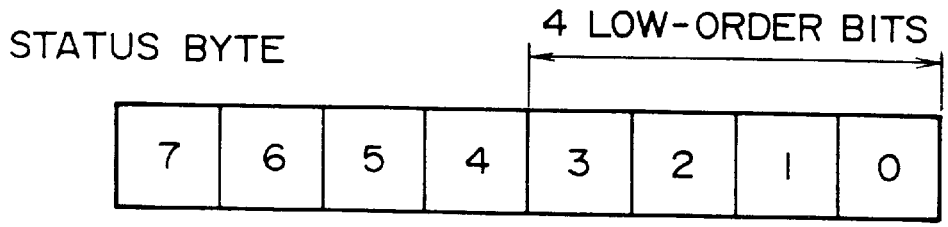
FIG. 35 is a diagram showing a method of designating the MIDI channel.
Figure 36:
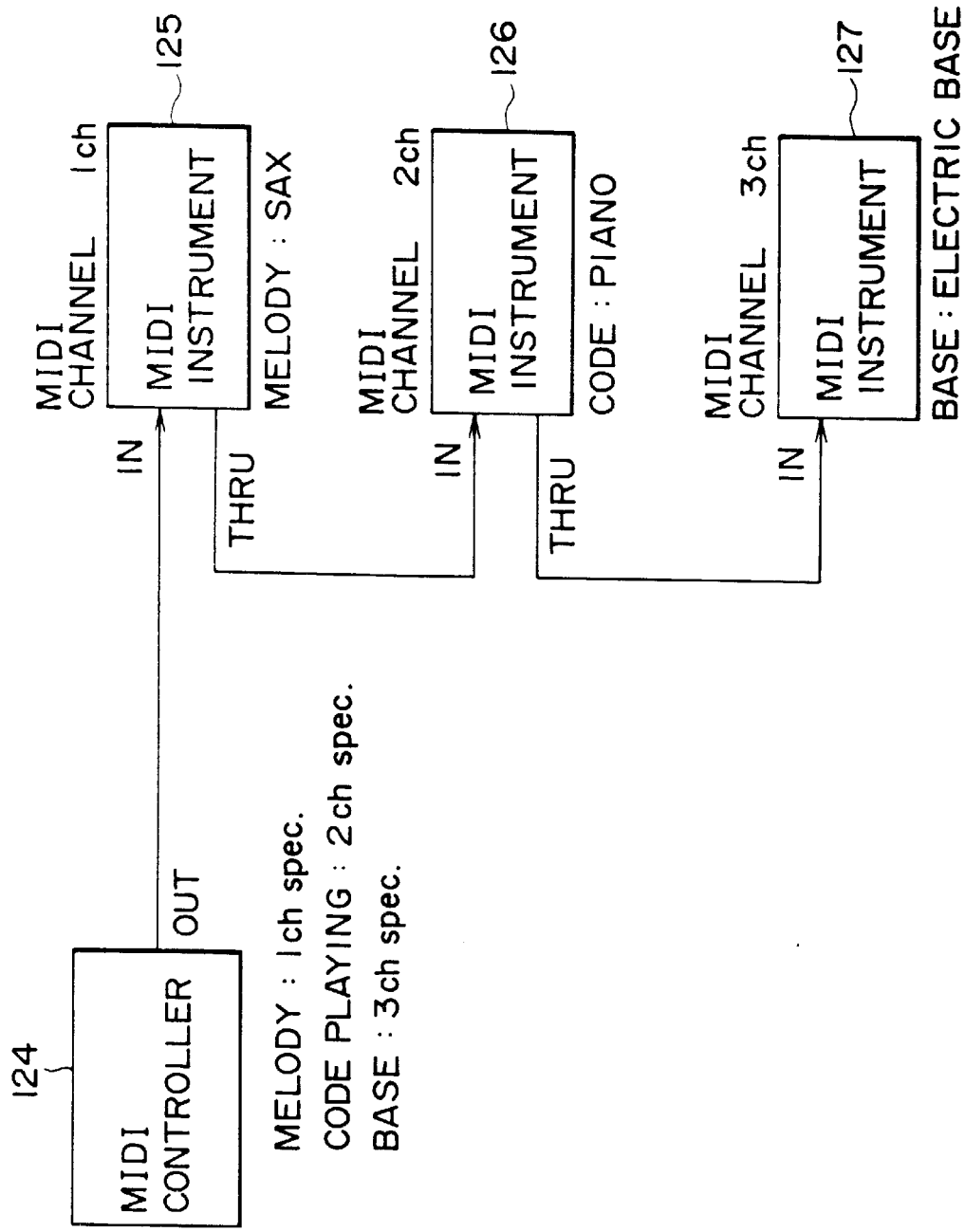
FIG. 36 is a diagram showing an example of a method of using the MIDI channel.

The converter that has received an asynchronous packet including FIG. 19 and FIG. 20 converts the packet into the MIDI message and sends it to the MIDI musical instrument. The MIDI musical instrument confirms the designated channel from 4 bits in low figures of the status byte shown in FIG. 35, and generates sound when the channel is designated.

Due to the fact that the MIDI signal in the present state is of low speed and packet transmission, asynchronous transmission of the IEEE-1394 serial bus is suitable for the transmission of the MIDI message. However, the isochronous data transmission is more suitable for the system exclusive message when it coexists with attainment of high speed in MIDI standards and digital audio signal transmission on the IEEE-1394 serial bus and among the MIDI messages in the present state. Thus, a method of loading a music/musical instrument signal conforming to MIDI standards on the isochronous packet of the IEEE-1394 serial bus will be described in the next place.

Figures 21, 22:
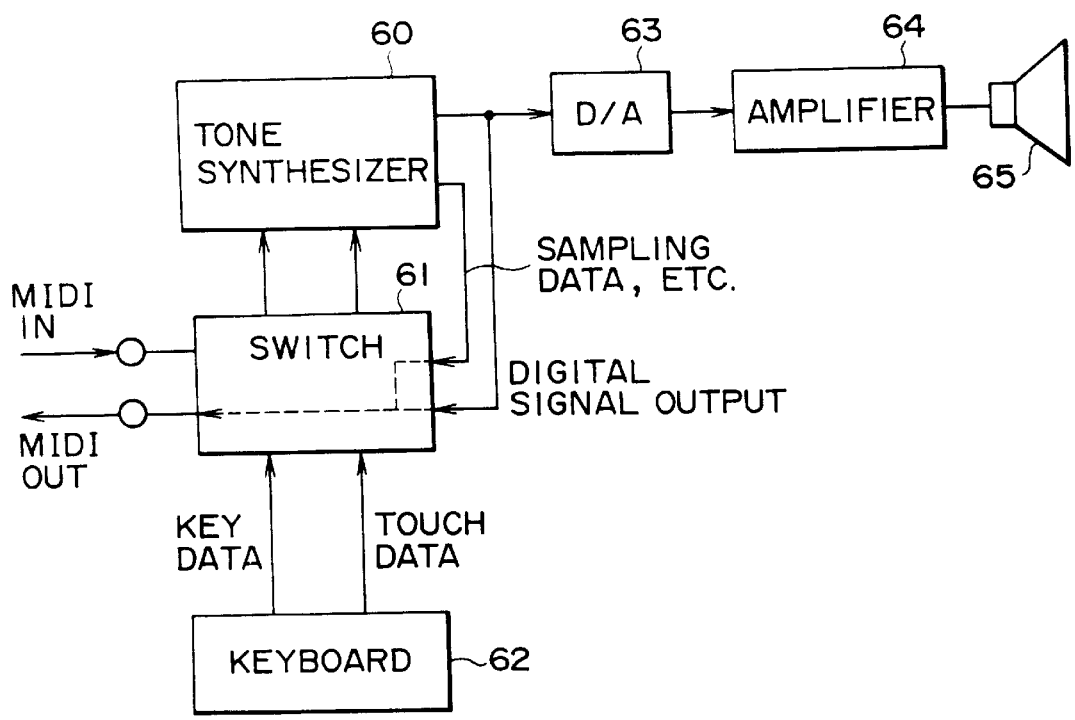
FIG. 21 shows an example of bit allocation of DATAF of a format related to music/musical instrument of $EMT=000100_2$ of the CIP header.
FIG. 22 is a block diagram of a MIDI musical instrument for performing isochronous data transmission.

The formats of the isochronous packet have been described with reference to FIG. 4 to FIG. 8. It is possible to constitute 16 different channels on isochronous transmission by converting the MIDI channel of the MIDI message into the channel of isochronous transmission. Further, it is possible to transmit 64 isochronous packets when the MIDI standards are extended in the future or in higher speed music/musical instrument data transmission format. FIG. 21 shows an example of bit allocation of DATAF of the format related to music/musical instrument at FMT=$000100_2$ of the CIP header.

Next, isochronous transmission in the present invention will be described using an example of transmission of sampling data of the MIDI musical instrument that becomes a slave and feedback of digital signal data from the OUT terminal.

FIG. 22 is a block diagram of a MIDI musical instrument for transmitting isochronous data. It is assumed that the MIDI IN terminal and the MIDI OUT terminal of this MIDI musical instrument are connected to the I/O terminal of the converter shown in FIG. 14. As shown in FIG. 22, this MIDI musical instrument is provided with a tone synthesis portion 60, a switch 61, a keyboard 62, a D/A converter 63, an amplifier 64 and a speaker 65.

Key data and touch data from the keyboard 62 are sent to the tone synthesis portion 60 through the switch 61. The tone synthesis portion 60 synthesizes a digital tone waveform signal based on the key data and the touch data. Further, the MIDI message is converted into the key data and the touch data from the IN terminal through the switch 61 and inputted to the tone synthesis portion. Thus, even when the keyboard 62 is not played, performance can be made by the MIDI message from IN.

There are an FM system and a PCM system in the tone synthesis systems. In the PCM system, the actual sound is stored digitally and read out of the memory by the instruction from the keyboard or the MIDI message at time of reproduction.

The digital signal outputted from the tone synthesis portion 60 is converted into an analog signal by the D/A converter 63, and generates a music sound from the speaker 65 through the amplifier 64. Further, it is also possible to input the digital signal outputted from the tone synthesis portion 60 to the converter from OUT of MIDI signal output through the switch 61, to convert it into the format of isochronous data transmission of the IEEE-1394 serial bus and to feed it back to an equipment on the bus. When the digital signal is fed back, the format of IEEE-1394 serial bus transmission can apply correspondingly to the format of the digital audio interface prescribed in IEC-958 for instance.

Furthermore, this MIDI musical instrument has a sampling function. Sampling means that a user records digital data by itself. Here, the data are stored in a memory in the tone synthesis portion 60.

It is possible to input the sampling data outputted from the tone synthesis portion 60 in the converter from OUT of the MIDI signal output through the switch 61 similarly to the digital signal output, to convert it into a format of isochronous data transmission of the IEEE-1394 serial bus and transmit it to the device on the bus.

Figure 23:
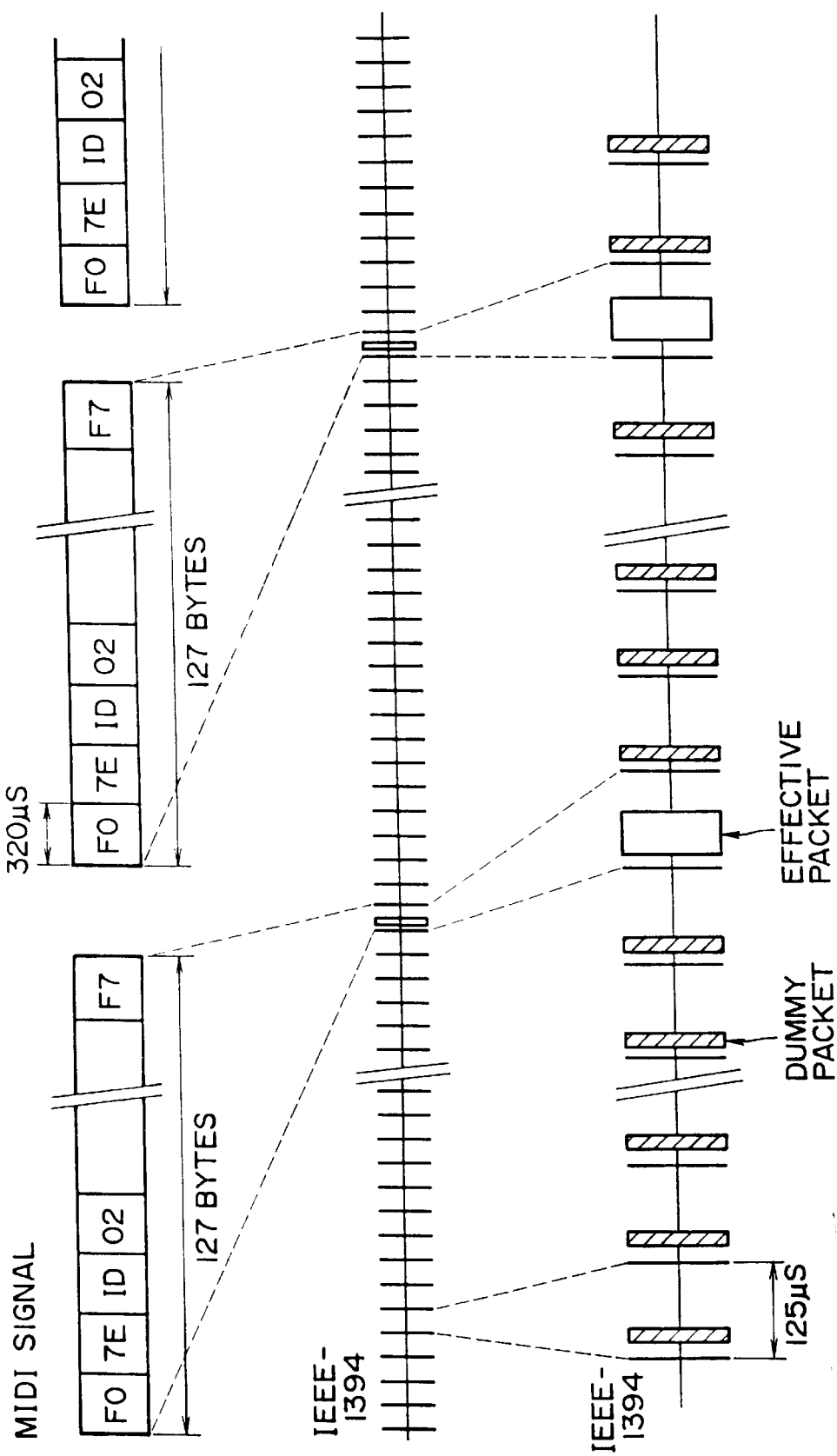
FIG. 23 is a diagram showing a method of transmitting a system exclusive message in an isochronous transmission mode of the IEEE-1394 serial bus.

FIG. 23 shows a method of transmitting the system exclusive message in the isochronous transmission mode of the IEEE-1394 serial bus. The data packet has a fixed data quantity of 127 bytes, and when this packet is transmitted as a MIDI signal, it takes 320$\mu$S×127=4.064 mS at the shortest. The number of isochronous packets in the interim becomes 4.064 mS÷125 $\mu$S=325.12. Since the data are transmitted in the unit of quadlet=4 bytes in the IEEE-1394 serial bus, 128 bytes (=32 quadlet) is formed by adding a dummy byte of one byte to the data packet of 127 bytes. Thus, 6 bytes of methods of transmitting 1, 2, 4, 8, 16 and 32 quadlets with one isochronous packet are conceivable.

In a method of transmitting 32 quadlets, 324 pieces of packets among approximately 325 pieces of isochronous packets become dummy packets that do not transmit data. The length of the effective packet when the clock frequency is 100 MHz becomes (32+5)×32÷100 MHz=approximately 12 $\mu$S.

In a method of transmitting one quadlet with one isochronous packet, about 9 pieces out of 10 pieces of packets also become dummy packets. The length of an effective packet when the data of one quadlet are transmitted with one isochronous packet becomes (1+5)×32÷100 MHz= approximately 2 $\mu$S.

Six types of methods are put in order as follows.

| Number of Quadlet | Effective packet | Dummy packet | Length of effective packet |
|---|---|---|---|
| 32 | 1 | 325 | 11.84 $\mu$S |
| 16 | 2 | 324 | 6.72 $\mu$S |
| 8 | 4 | 322 | 4.16 $\mu$S |
| 4 | 8 | 318 | 2.88 $\mu$S |
| 2 | 16 | 310 | 2.24 $\mu$S |
| 1 | 32 | 294 | 1.92 $\mu$S |

When 32 quadlets are transmitted with one isochronous packet, a band of 12 $\mu$S in 125 $\mu$S is occupied. However, since there is low possibility that data are dumped from a plurality of digital samplers, it is possible to transmit the data packet of the MIDI message approximately every 4 mS with the isochronous packet. The number of quadlets in one isochronous packet may be selected among any of six types mentioned above.

Figure 24:
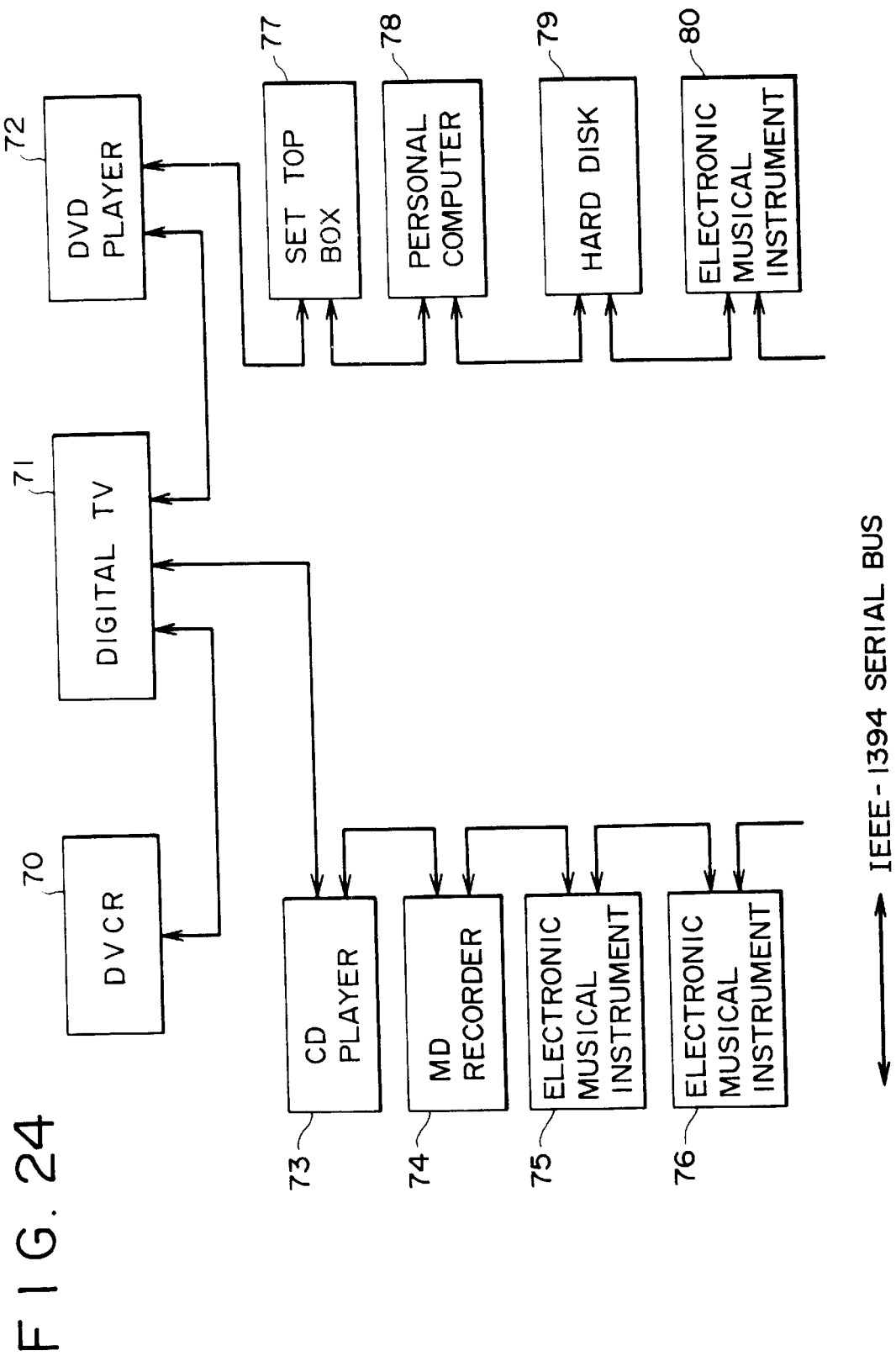
FIG. 24 is a block diagram showing still another example of a bidirectional data transmission system applied with the present invention.
Figure 25:
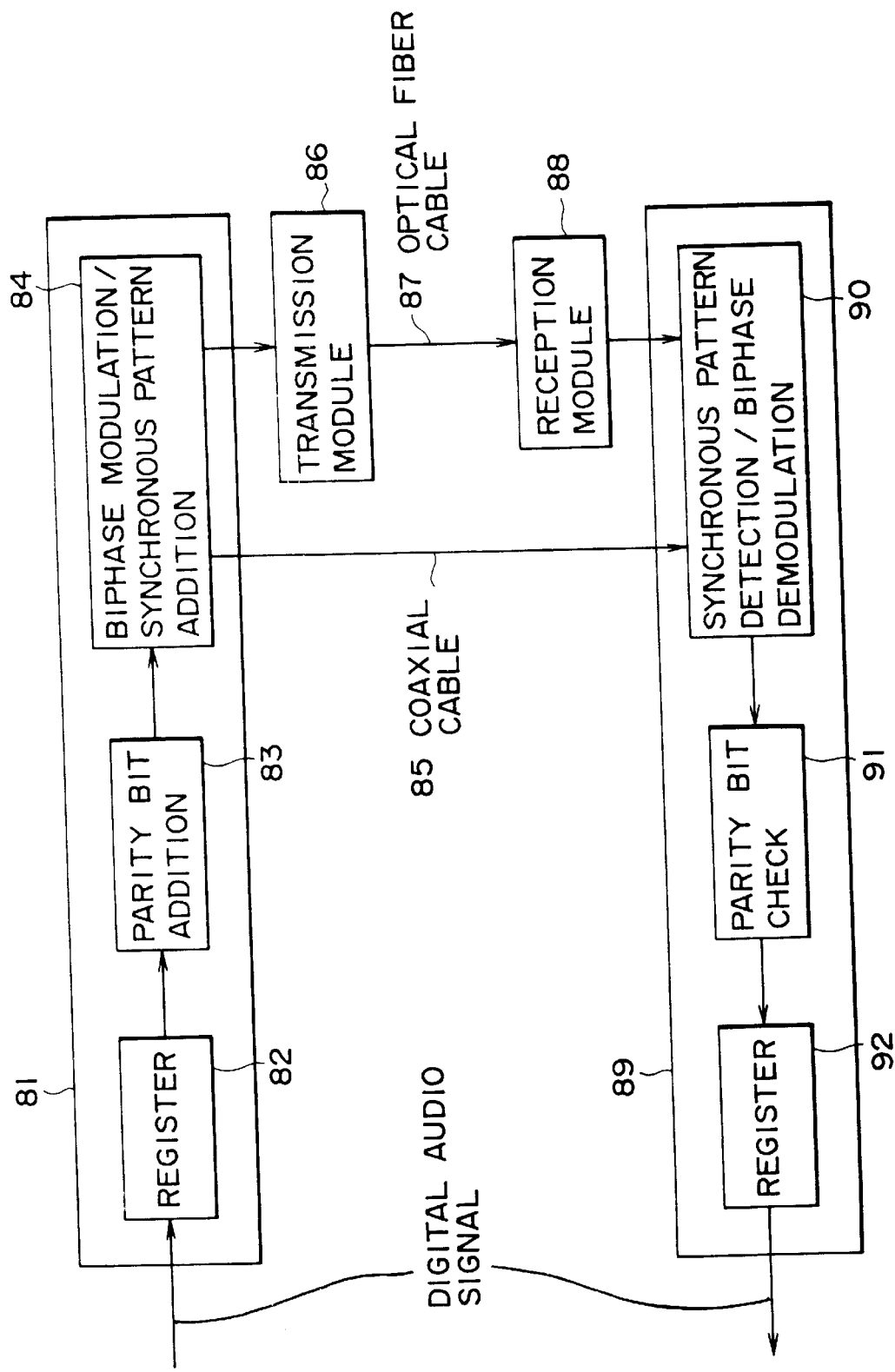
FIG. 25 is a diagram showing a transmission example of a digital audio signal using a digital audio interface.
Figure 26:
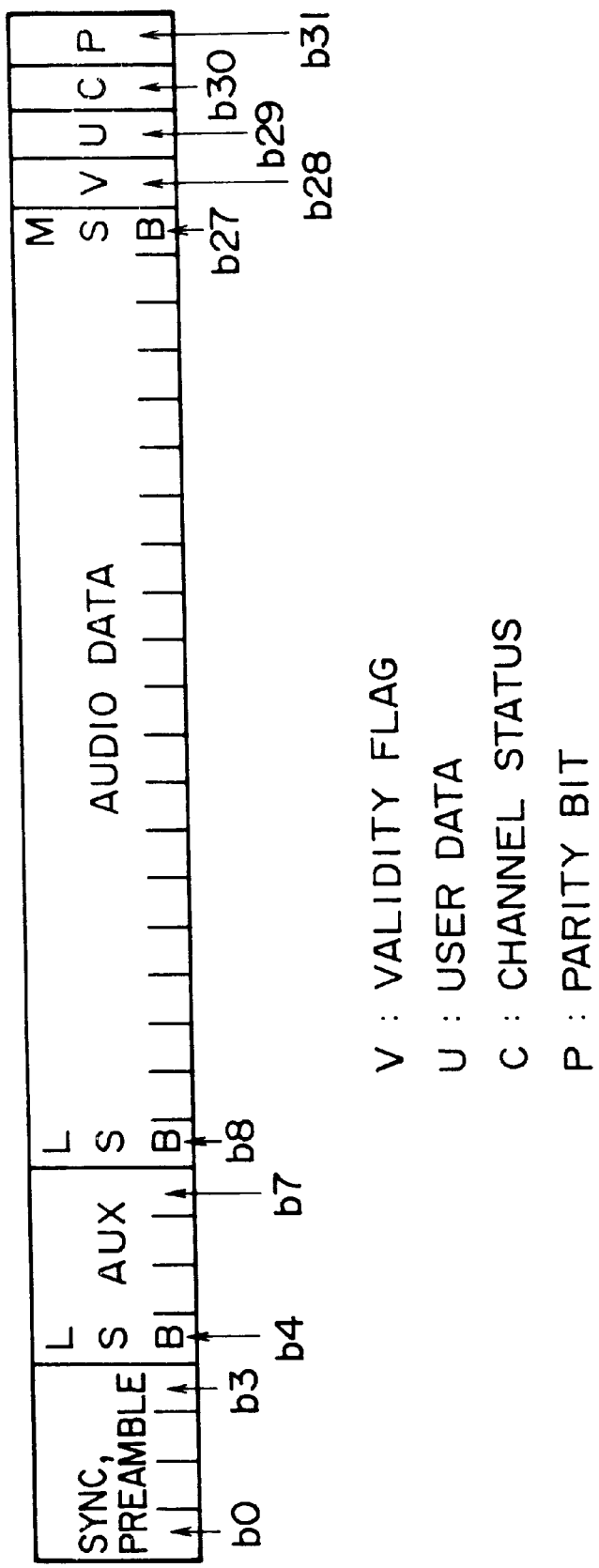
FIG. 26 is a diagram showing a structure of a subframe of a digital audio interface.

FIG. 24 is a block diagram showing still another example of a bidirectional data transmission system applied with the present invention. Since the converter shown in FIG. 14 is built in electronic musical instruments 75, 76 and 80 in the present system, mutual conversion of the protocol can be made inside. Therefore, these electronic musical instruments have nodes ID on the IEEE-1394 serial bus, and can communicate a message by the protocol of the IEEE-1394 serial bus. Further, since a CD player 73 and an MD recorder 74 are provided with the IEC958/IEEE-1394 converter similarly to FIG. 14, communication can be made with the protocol of the IEEE-1394 serial bus. Further, since a DVCR 70, a digital TV 71, a DVD player 72, a set top box 77, a personal computer 78 and a hard disk unit 79 are each provided with a digital interface for the IEEE-1394 serial bus, it is possible to communicate a message with the protocol of the IEEE-1394 serial bus.

Besides, the present invention is not limited to above-mentioned embodiments, but various modifications thereof can be made based on the spirit of the present invention, which are not excluded from the scope of the present invention.

For example, it may be arranged so that the digital audio interface is not provided, but only the digital interface for the IEEE-1394 serial bus is provided in a digital audio equipment such as a CD player in FIG. 24, and a digital audio signal is processed with the protocol of IEEE-1394.

Similarly, it may also be arranged so that no MIDI is provided, but only a digital interface for the IEEE-1394 serial bus is provided in the electronic musical instruments shown in FIG. 24, and the music/musical instrument signal is processed with the protocol of IEEE-1394.

When the IEEE-1394 serial bus is popularized and the digital audio interface and MIDI become unnecessary in the future, these methods are effective. However, a protocol corresponding to the digital audio interface, in other words, the protocol on the IEEE-1394 serial bus shown in FIG. 1 is adopted for the protocol used for the digital interface for the IEEE-1394 serial bus, thereby to minimize the change in structure extending from the present to future. The same is applied to MIDI. The statement that "the format of the interface for transmitting digital data unidirectionally is converted into an isochronous transmission format of the interface for transmitting digital data bidirectionally" according to the present invention includes such a configuration.

Further, the present invention is applicable, for example, to synchronous transmission of a linear digital audio signal, synchronization of a non-linear digital audio signal, asynchronous transmission or the like. Furthermore, the present invention is also applicable to bidirectional transmission of a control command together with these signals.

Further, the present invention is also applicable, for example, to the digital audio data transmission format other than high-speed interface of the music/musical instrument and the digital audio interface.

As described in detail above, according to the present invention, it is possible to reduce the number of I/O terminals of an equipment by converting a format of the interface for performing signal transmission in a point-to-point or tree form unidirectionally into an isochronous transmission format or an asynchronous transmission format of the interface for transmitting digital data bidirectionally.

Accordingly, in the equipment that becomes the center of a system such as an amplifier and a receiver of TV and audio units including analog equipments, signal cables have been connected in a tree form, but it becomes possible to perform bidirectional transmission of a digital audio signal only by connecting one line of cable by applying the present invention. Further, in the MIDI musical instruments, MIDI cables have been wired concentratedly to the parabox for connecting a plurality of musical instruments, but it becomes possible to perform bidirectional transmission of performance information and control information of a music/musical instrument signal only by connecting one line of cable by applying the present invention.

Further, according to the present invention, the transmission format of the control command is converted into an asynchronous transmission format of an interface for transmitting digital data bidirectionally and transmitted after time-division multiplex with the isochronous transmission packet described above, thereby making it possible to omit the cables and the terminals of the interface for control command transmission from the equipments of the system.

Further, according to the present invention, by converting signal transmission of linear digital audio using the digital audio interface and non-linear digital audio and music/musical instrument signal with a format common to the bidirectional digital interface, mutual transmission and control of an information signal becomes easy in a system in which a video equipment such as TV and DVCR, a personal computer and various digital audio equipments and electronic musical instruments are connected to the same bidirectional digital interface.

Furthermore, it becomes easier to mutually communicate a signal and a control command among music/musical instruments and AV equipments by converting a transmission format of a unidirectional music/musical instrument signal into an asynchronous transmission mode of the interface for bidirectional transmission of digital data, thereby to have it coincide with the transmission format of the control command for AV equipments.

Further, it is possible to convert a transmission format of a unidirectional music/musical instrument signal and the format thereof made high in speed into an isochronous transmission format of the interface for performing bidirectional transmission of digital data, thereby to transmit a large amount of data in a short period of time.

What is claimed is:

1. A data communication method, comprising:
converting a format of a first interface for use in transmitting digital data unidirectionally to an isochronous transmission format of a second interface for use in transmitting digital data bidirectionally, said first interface using said digital data unidirectionally having a sampling frequency selected from a number of sampling frequencies;

converting a control signal to an asynchronous transmission format of said second interface; and transmitting said control signal in said asynchronous transmission format time-divisionally multiplexed with said digital data in said isochronous transmission format represented by a plurality of data blocks, the length of each data block being set to a combination of a predetermined number of data packets which is the same for each of the selected sampling frequencies of said first interface and a remaining number of dummy packets according to said each selected sampling frequency.

2. The data communication method according to claim 1, wherein the digital data are music/musical instrument signals.

3. The data communication method according to claim 2, wherein the music/musical instrument signal is transmitted in said asynchronous transmission format for audio/video equipment.

4. The data communication method according to claim 1, wherein said control signal is selectively transmitted via another interface connected to said first interface for transmitting digital data unidirectionally or via an apparatus provided with said first interface.

5. The data communication method according to claim 4, wherein the digital data are digital audio signals.

6. The data communication method according to claim 1, wherein a header that belongs to a packet of said isochronous transmission format is made common to a number of types of digital data.

7. The data communication method according to claim 1, wherein a header is equipped with an identification code for identifying a mode of transmitting synchronously with a cycle of isochronous transmission from a mode of transmitting asynchronously therewith for a number of types of digital data.

8. The data communication method according to claim 1, wherein an identification code for identifying the type of digital data is added to the data of said isochronous transmission format.

9. The data communication method according to claim 1, wherein a synchronous signal of said first interface for transmitting digital data unidirectionally is bit-compressed such that the signal is inserted into a header of isochronous transmission of said second interface for transmitting digital data bidirectionally.

10. Data communication apparatus, comprising:
isochronous converting means for converting a format of a first interface for use in transmitting digital data unidirectionally to an isochronous transmission format of a second interface for use in transmitting digital data bidirectionally, said first interface using said digital data unidirectionally having a sampling frequency selected from a number of sampling frequencies;

asynchronous converting means for converting a control signal to an asynchronous transmission format of said second interface; and means for transmitting said control signal in said asynchronous transmission format time-divisionally multiplexed with said digital data in said isochronous transmission format represented by a plurality of data blocks, the length of each data block being set to a combination of a predetermined number of data packets which is the same for each of the selected sampling frequencies of said first interface and a remaining number of dummy packets according to said each selected sampling frequency.

11. The data communication apparatus according to claim 10, wherein the digital data include signals from musical instruments.

12. The data communication apparatus according to claim 10, wherein the digital data include digital audio signals.

13. A data communication converter, comprising:

a link layer unit for converting a format of a first interface for use in transmitting digital data unidirectionally to an isochronous transmission format of a second interface for use in transmitting digital data bidirectionally, said first interface using said digital data unidirectionally having a sampling frequency selected from a number of sampling frequencies, said converter converting a control signal to an asynchronous transmission format of said second interface; and a physical layer unit for transmitting said control signal in said asynchronous transmission format time-divisionally multiplexed with said digital data in said isochronous transmission format represented by a plurality of data blocks, the length of each data block being set to a combination of a predetermined number of data packets which is the same for each of the selected sampling frequencies of said first interface and a remaining number of dummy packets according to said each selected sampling frequency.

14. The data communication converter according to claim 13, wherein the data packets comprise an identification code for distinguishing between a mode of transmitting synchronously with a cycle of isochronous transmission and another mode of transmitting asynchronously for a number of types of digital data.

15. The data communication converter according to claim 13, wherein an identification code for identifying the type of digital data is added to the data of said isochronous transmission format.

16. The data communication converter according to claim 13, wherein the signal of said first interface for transmitting digital data unidirectionally is bit-compressed such that the signal is inserted into a header of isochronous transmission of said second interface for transmitting digital data bidirectionally.

* * * * *